United States Patent
Shen et al.

(10) Patent No.: US 12,063,070 B2
(45) Date of Patent: *Aug. 13, 2024

(54) WIRELESS RADIO FREQUENCY CONVERSION SYSTEM AND ONE-TO-MANY DISTRIBUTING DEVICE

(71) Applicant: AuthenX Inc., Hsinchu County (TW)

(72) Inventors: Po-Kuan Shen, Hsinchu County (TW); Yu-Chun Wang, Hsinchu County (TW); Kai-Lun Han, Hsinchu County (TW); Jenq-Yang Chang, Hsinchu County (TW); Mao-Jen Wu, Hsinchu County (TW)

( * ) Notice: Subject to any disclaimer, the term of this patent is extended or adjusted under 35 U.S.C. 154(b) by 69 days.

This patent is subject to a terminal disclaimer.

(21) Appl. No.: 17/930,424

(22) Filed: Sep. 8, 2022

(65) Prior Publication Data
US 2023/0088257 A1 Mar. 23, 2023

Related U.S. Application Data

(60) Provisional application No. 63/242,545, filed on Sep. 10, 2021.

(51) Int. Cl.
*H04B 10/2575* (2013.01)

(52) U.S. Cl.
CPC . *H04B 10/25753* (2013.01); *H04B 10/25752* (2013.01)

(58) Field of Classification Search
CPC .................... H04B 10/25752; H04B 10/25753
USPC ........................................................ 398/115
See application file for complete search history.

(56) References Cited

U.S. PATENT DOCUMENTS

| | | | |
|---|---|---|---|
| 7,349,634 B2 * | 3/2008 | Sasai | H04B 10/25753 398/115 |
| 9,184,962 B2 * | 11/2015 | Tarlazzi | H04W 88/085 |
| 10,075,779 B2 * | 9/2018 | Erreygers | H04B 10/25752 |
| 2002/0057868 A1 * | 5/2002 | Wu | H04J 14/0213 385/24 |
| 2009/0180426 A1 | 7/2009 | Sabat et al. | |
| 2011/0243502 A1 * | 10/2011 | Matsuura | G02B 6/29367 359/834 |
| 2011/0268446 A1 | 11/2011 | Cune et al. | |
| 2011/0268449 A1 | 11/2011 | Berlin et al. | |
| 2013/0216229 A1 | 8/2013 | Cvijetic et al. | |
| 2015/0057039 A1 | 2/2015 | Soriaga et al. | |

(Continued)

*Primary Examiner* — Dalzid E Singh

(57) ABSTRACT

A wireless radio frequency conversion system is disclosed. The wireless radio frequency conversion system includes a primary distributing device, a one-to-many conversion device, a plurality of first optical fiber networks, a plurality of remote antenna devices, and a plurality of antennas. The primary distributing device is configured to receive a first photoelectric signal. The one-to-many conversion device is configured to perform an optical-electrical conversion and a one-to-many conversion to the first photoelectric signal so as to generate a plurality of second photoelectric signals. The plurality of first optical fiber networks are configured to transmit the plurality of second photoelectric signals. The plurality of remote antenna devices are configured to receive and perform an optical-electrical conversion to the plurality of second photoelectric signals so as to generate a plurality of third photoelectric signals. The plurality of antennas are configured to transmit the plurality of third photoelectric signals.

30 Claims, 15 Drawing Sheets

(56) References Cited

U.S. PATENT DOCUMENTS

| | | |
|---|---|---|
| 2016/0182180 A1 | 6/2016 | Ou et al. |
| 2017/0047996 A1* | 2/2017 | Feng .................... H04B 10/11 |
| 2017/0126320 A1* | 5/2017 | Cho ................ H04B 10/25754 |
| 2019/0289375 A1 | 9/2019 | Cune et al. |
| 2019/0379443 A1 | 12/2019 | Pyun et al. |
| 2020/0195348 A1 | 6/2020 | Cune et al. |

* cited by examiner

WIRELESS RADIO FREQUENCY CONVERSION SYSTEM AND ONE-TO-MANY DISTRIBUTING DEVICE

CROSS-REFERENCE TO RELATED APPLICATION

This application claims priority to U.S. Provisional Application Ser. No. 63/242,545 filed Sep. 10, 2021, the disclosures of which are incorporated herein by reference in their entireties.

BACKGROUND

Field of Invention

The present disclosure relates to a wireless transmission system and a distributing device. More particularly, the present disclosure relates to a wireless radio frequency conversion system and a one-to-many distributing device.

Description of Related Art

Millimeter wave technology brings many performance benefits and it is an essential part of the 5th generation mobile networks (5G) system.

However, millimeter wave technology has several well-known communication problems, such as: path transmission loss, transmission attenuation through walls, and so on. Therefore, there is a need to provide a new system disposition for 5G network so as to meet the need of 5G network. As such, there is an urgent need for industry to find out a solution.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

The present disclosure provides a wireless radio frequency conversion system. The wireless radio frequency conversion system includes a primary distributing device, a one-to-many conversion device, a plurality of first optical fiber networks, a plurality of remote antenna devices, and a plurality of antennas. The primary distributing device is configured to receive a first photoelectric signal. The one-to-many conversion device is configured to perform an optical-electrical conversion and a one-to-many conversion to the first photoelectric signal so as to generate a plurality of second photoelectric signals. The plurality of first optical fiber networks are configured to transmit the plurality of second photoelectric signals. The plurality of remote antenna devices are configured to receive and perform the optical-electrical conversion to the plurality of second photoelectric signals so as to generate a plurality of third photoelectric signals. The plurality of antennas are configured to transmit the plurality of third photoelectric signals.

In one embodiment, the wireless radio frequency conversion system comprises a wireless front-end device and a first optical-electrical convertor. The wireless front-end device is configured to receive a radio frequency signal. The first optical-electrical convertor is configured to receive and transform the radio frequency signal into the first photoelectric signal, wherein the first photoelectric signal is an optical signal.

In one embodiment, the wireless radio frequency conversion system comprises a second optical fiber network, and the second optical fiber network is configured to transmit the first photoelectric signal.

In one embodiment, the primary distributing device comprises a second optical-electrical convertor and a radio frequency processor. The second optical-electrical convertor is configured to receive and transform the first photoelectric signal from the second optical fiber network into a first electrical signal. The radio frequency processor is configured to perform a signal processing to the first electrical signal.

In one embodiment, the one-to-many conversion device is configured to perform the optical-electrical conversion and the one-to-many conversion to the first electrical signal so as to generate and transmit the plurality of second photoelectric signals through the plurality of first optical fiber network, wherein the plurality of second photoelectric signals are optical signals.

In one embodiment, each of the plurality of remote antenna devices comprises an antenna terminal optical-electrical convertor, and the antenna terminal optical-electrical convertor is configured to receive and perform the optical-electrical conversion to one of the plurality of second photoelectric signals from one of the plurality of first optical fiber networks so as to generate a second electrical signal.

In one embodiment, each of the plurality of remote antenna devices is further configured to perform the signal processing to the second electrical signal so as to generate the plurality of third photoelectric signals, and transmit the plurality of third photoelectric signals to a corresponding antenna of the plurality of antennas.

In one embodiment, the radio frequency processor distributes the first electrical signal into a plurality of first sub-photoelectric signals, wherein the one-to-many conversion device comprises a third optical-electrical convertor, a one-to-many distributing device, and a third optical fiber network. The third optical-electrical convertor is configured to receive and perform the optical-electrical conversion to one of the plurality of first sub-photoelectric signals so as to generate one of a plurality of second sub-photoelectric signals, wherein the plurality of second sub-photoelectric signals are optical signals. The one-to-many distributing device is configured to receive and distribute one of the plurality of second sub-photoelectric signals into a plurality of second photoelectric signals. The third optical fiber network is configured to connect the third optical-electrical convertor and the one-to-many distributing device.

In one embodiment, the one-to-many distributing device comprises a first beamsplitter, a first connector, a second beamsplitter, and a second connector. The first beamsplitter is configured to partially reflect one of the plurality of second sub-photoelectric signals so as to generate a first reflecting signal, and be partially penetrated by one of the plurality of second sub-photoelectric signals so as to generate a first penetrating signal. The first connector is configured to output the first reflecting signal to be one of the plurality of second photoelectric signals. The second beamsplitter is configured to partially reflect the first penetrating signal so as to generate a second reflecting signal, and be partially penetrated by the first penetrating signal so as to generate a second penetrating signal. The second connector is configured to output the second reflecting signal to be one of the plurality of second photoelectric signals.

In one embodiment, each of the plurality of remote antenna devices comprises an antenna terminal optical-electrical convertor and a front-end processor. The antenna terminal optical-electrical convertor is configured to receive and perform the optical-electrical conversion to one of the plurality of second photoelectric signals so as to generate one of the plurality of third photoelectric signals. The front-end processor is configured to perform the signal processing to and transmit one of the plurality of third photoelectric signals to one of the plurality of antennas.

In one embodiment, the primary distributing device comprises a baseband transceiver, and the baseband transceiver is configured to perform a signal processing to the first photoelectric signal so as to generate a first sub-photoelectric signal. The one-to-many conversion device is configured to perform the optical-electrical conversion and the one-to-many conversion to the first sub-photoelectric signal so as to generate and transmit the plurality of second photoelectric signals through the plurality of first optical fiber networks, wherein the plurality of second photoelectric signals are optical signals.

The present disclosure provides a wireless radio frequency conversion system. The wireless radio frequency conversion system includes a primary distributing device, a one-to-many conversion device, a plurality of remote antenna devices, and a plurality of antennas. The primary distributing device is configured to receive or transmit a first photoelectric signal. The one-to-many conversion device is configured to perform an optical-electrical conversion and a one-to-many conversion to the first photoelectric signal so as to generate a plurality of second photoelectric signals, or perform the optical-electrical conversion to and a many-to-one conversion to the plurality of second photoelectric signals so as to generate the first photoelectric signal. The plurality of remote antenna devices are configured to perform the optical-electrical conversion between the plurality of second photoelectric signals and a plurality of third photoelectric signals. The plurality of antennas are configured to receive or transmit the plurality of third photoelectric signals.

In one embodiment, the wireless radio frequency conversion system of further comprises a wireless front-end device and a first optical-electrical convertor. The wireless front-end device is configured to receive or transmit a radio frequency signal. The first optical-electrical convertor is configured to perform the optical-electrical conversion between the radio frequency signal and the first photoelectric signal, wherein the first photoelectric signal is an optical signal.

In one embodiment, the wireless radio frequency conversion system of further comprises a first optical fiber network, and the first optical fiber network is configured to transmit the first photoelectric signal.

In one embodiment, the primary distributing device comprises a second optical-electrical convertor and a radio frequency processor. The second optical-electrical convertor is configured to perform the optical-electrical conversion between the first photoelectric signal and a first electrical signal. The radio frequency processor is configured to perform a signal processing to the first electrical signal.

In one embodiment, the one-to-many conversion device is configured to perform the optical-electrical conversion and the one-to-many conversion to the first electrical signal so as to generate the plurality of second photoelectric signals, or perform the optical-electrical conversion and the many-to-one conversion to the plurality of second photoelectric signals so as to generate the first electrical signal, wherein the plurality of second photoelectric signals are optical signals, wherein the wireless radio frequency conversion system further comprises a second optical fiber network, and the second optical fiber network is configured to transmit the plurality of second photoelectric signals.

In one embodiment, each of the plurality of remote antenna devices comprises an antenna terminal optical-electrical convertor, and the antenna terminal optical-electrical convertor is configured to perform the optical-electrical conversion between one of the plurality of second photoelectric signals and a second electrical signal.

In one embodiment, each of the plurality of remote antenna devices is further configured to perform the signal processing between the second electrical signal and the plurality of third photoelectric signals.

In one embodiment, the radio frequency processor distributes the first electrical signal into a plurality of first sub-photoelectric signals, or processes the plurality of first sub-photoelectric signals into the first electrical signal, wherein the one-to-many conversion device comprises a third optical-electrical convertor, a one-to-many distributing device, and a third optical fiber network. The third optical-electrical convertor is configured to perform the optical-electrical conversion to one of the plurality of first sub-photoelectric signals and one of a plurality of second sub-photoelectric signals, wherein the plurality of second sub-photoelectric signals are optical signals. The one-to-many distributing device is configured to distribute one of the plurality of second sub-photoelectric signals into a plurality of second photoelectric signals, or process the plurality of second photoelectric signals into one of the plurality of second sub-photoelectric signals. The third optical fiber network is configured to connect the third optical-electrical convertor and the one-to-many distributing device.

In one embodiment, the one-to-many distributing device a first beamsplitter, a first connector, a second beamsplitter, and a second connector. The first beamsplitter is configured to partially reflect one of the plurality of second sub-photoelectric signals so as to generate a first reflecting signal, and be partially penetrated by one of the plurality of second sub-photoelectric signals so as to generate a first penetrating signal. The first connector is configured to output the first reflecting signal to be one of the plurality of second photoelectric signals. The second beamsplitter is configured to partially reflect the first penetrating signal so as to generate a second reflecting signal, and be partially penetrated by the first penetrating signal so as to generate a second penetrating signal. The second connector is configured to output the second reflecting signal to be one of the plurality of second photoelectric signals.

In one embodiment, each of the plurality of remote antenna devices comprises an antenna terminal optical-electrical convertor and a front-end processor. The antenna terminal optical-electrical convertor is configured to perform the optical-electrical conversion to one of the plurality of second photoelectric signals and one of the plurality of third photoelectric signals. The front-end processor is configured to perform the signal processing to one of the plurality of third photoelectric signals and the radio frequency signal.

In one embodiment, the primary distributing device comprises a baseband transceiver, and the baseband transceiver is configured to perform a signal processing between the first photoelectric signal and a first sub-photoelectric signal. The one-to-many conversion device is configured to perform the optical-electrical conversion and the one-to-many conversion to the first sub-photoelectric signal so as to generate the plurality of second photoelectric signals, or perform the optical-electrical conversion to and the many-to-one conversion to the plurality of second photoelectric signals so as to generate the first sub-photoelectric signal, wherein the plurality of second photoelectric signals are optical signals.

The present disclosure provides a one-to-many distributing device. The one-to-many distributing device is applied in a wireless radio frequency conversion system, and the one-to-many distributing device includes an optical-electrical convertor, a first beamsplitter, a first connector, a second beamsplitter, and a second connector. The optical-electrical convertor is configured to perform an optical-electrical conversion between an electrical signal and an optical signal. The first beamsplitter is configured to partially reflect the optical signal so as to generate a first reflecting signal, and be partially penetrated by the optical signal so as to generate a first penetrating signal. The first connector is configured to output the first reflecting signal. The second beamsplitter is configured to partially reflect the first penetrating signal so as to generate a second reflecting signal, and be partially penetrated by the first penetrating signal so as to generate a second penetrating signal. The second connector is configured to output the second reflecting signal.

In one embodiment, the optical-electrical convertor comprises a laser diode package structure, wherein the laser diode package structure is configured to convert the electrical signal into the optical signal, wherein the one-to-many distributing device further comprises a housing, wherein the first beamsplitter and the second beamsplitter are disposed inside the housing, and the laser diode package structure, the first connector, and the second connector are disposed outside the housing and attached to the housing.

In one embodiment, the optical-electrical convertor comprises a laser diode package structure, wherein the laser diode package structure is configured to convert the electrical signal into the optical signal, wherein the one-to-many distributing device further comprises a third connector and a housing. The third connector is coupled to the laser diode package structure, and configured to receive the optical signal from the laser diode package structure. The first beamsplitter and the second beamsplitter are disposed inside the housing, and the first connector, the second connector, and the third connector are disposed outside the housing and attached to the housing.

In one embodiment, the one-to-many distributing device one-to-many distributing devices an optical fiber, and the optical fiber is coupled between the third connector and the laser diode package structure, and configured to transmit the optical signal.

In one embodiment, the optical-electrical convertor comprises a bidirectional optical transceiver, wherein the bidirectional optical transceiver comprises a laser diode package structure, a photodiode package structure, and a filter. The laser diode package structure is configured to convert the electrical signal into the optical signal. The photodiode package structure is configured to convert the optical signal into the electrical signal. The filter is configured to be penetrated by the optical signal of the laser diode package structure, and configured to reflect the optical signal of the first beamsplitter to the photodiode package structure. The one-to-many distributing device further comprises a housing, wherein the first beamsplitter and the second beamsplitter are disposed inside the housing, and the bidirectional optical transceiver, the first connector, and the second connector are disposed outside the housing and attached to the housing.

In one embodiment, the optical-electrical convertor comprises a bidirectional optical transceiver, wherein the bidirectional optical transceiver comprises a laser diode package structure, a photodiode package structure, and a filter. The laser diode package structure is configured to convert the electrical signal into the optical signal. The photodiode package structure is configured to convert the optical signal into the electrical signal. The filter is configured to be penetrated by the optical signal of the laser diode package structure, and configured to reflect the optical signal of the first beamsplitter to the photodiode package structure. The one-to-many distributing device further comprises a third connector and a housing. The third connector is coupled to the bidirectional optical transceiver, and configured to transmit or receive the optical signal from the bidirectional optical transceiver. The first beamsplitter and the second beamsplitter are disposed inside the housing, and the first connector, the second connector, and the third connector are disposed outside the housing and attached to the housing.

In one embodiment, the one-to-many distributing device further comprises an optical fiber, and the optical fiber is coupled between the third connector and the bidirectional optical transceiver, and configured to transmit the optical signal.

In one embodiment, the one-to-many distributing device further comprises a first optical fiber and a second optical fiber. The first optical fiber is coupled to the first connector, and configured to transmit the first reflecting signal. The second optical fiber is coupled to the second connector, and configured to transmit the second reflecting signal.

Therefore, based on the technical content of the present disclosure, the present disclosure provides a wireless radio frequency conversion system and a one-to-many distributing device. Since the wireless radio frequency conversion system adopts the conversion device and the optical fiber network to implement the connections between the elements. Therefore, the elements of the wireless radio frequency conversion system can be disposed on different sides of the wireless radio frequency conversion system. As such, the system deployment of the wireless radio frequency conversion system is more flexible and simpler.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DETAILED DESCRIPTION

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

Figure 1:
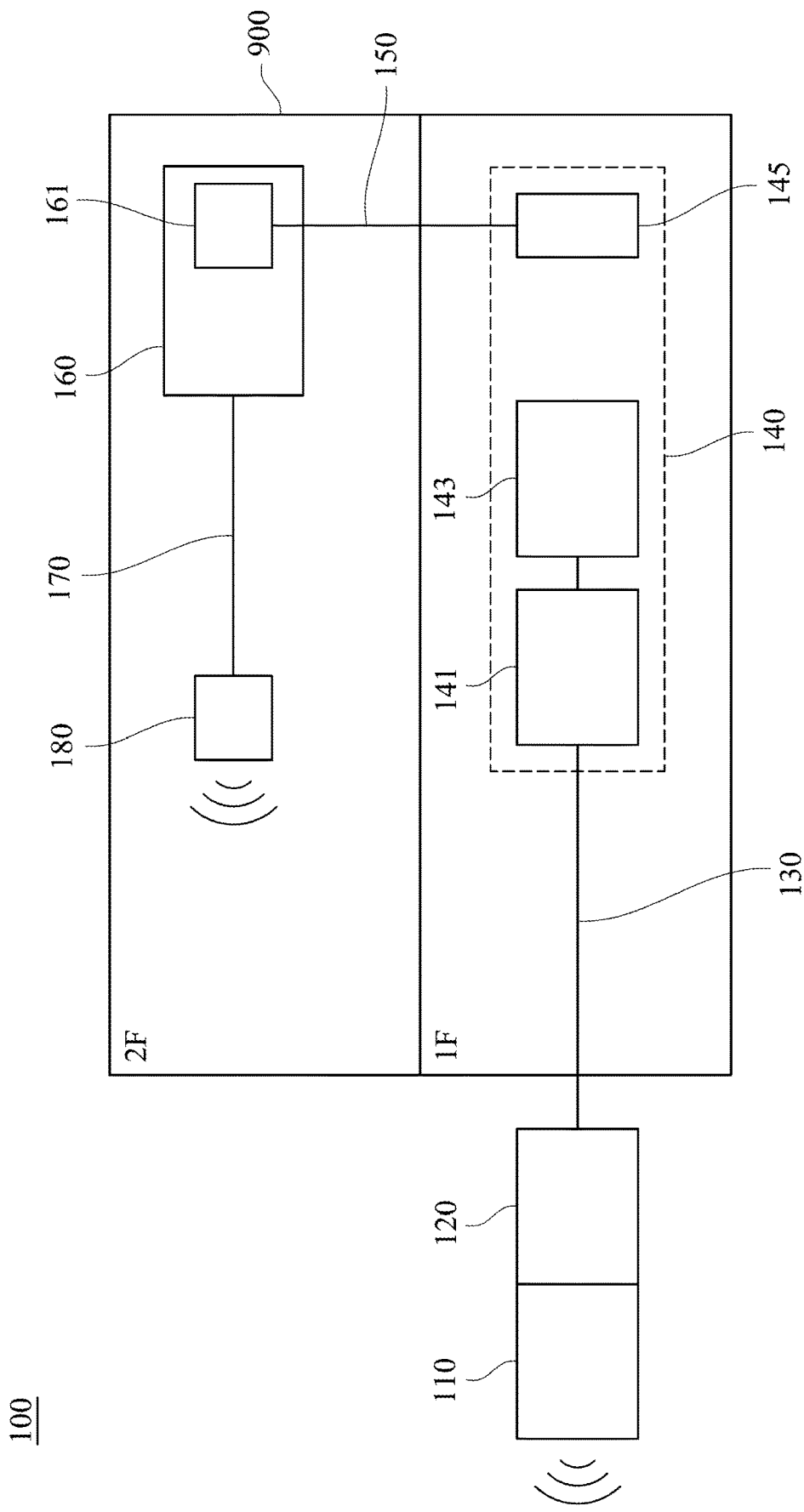
FIG. 1 depicts a schematic diagram of a wireless radio frequency conversion system according to one embodiment of the present disclosure.

FIG. 1 depicts a schematic diagram of a wireless radio frequency conversion system 100 according to one embodiment of the present disclosure. As shown in the figure, the wireless radio frequency conversion system 100 include a wireless front-end device 110, an optical-electrical convertor 120, an optical fiber network 130, a primary distributing device 140, an optical fiber network 150, a remote antenna device 160, an electrical signal transmitting line 170, and an antenna 180. In addition, the primary distributing device 140 includes an optical-electrical convertor 141, a radio frequency processor 143, and an optical-electrical convertor 145 in the primary distributing device terminal. In one embodiment, the number of the optical fiber network 150, the remote antenna device 160, the electrical signal transmitting line 170, and the antenna 180 can be plural depending on actual requirements.

With respect to connection, the wireless front-end device 110 connects the optical-electrical convertor 120, the optical-electrical convertor 120 connects the optical fiber network 130, and the optical fiber network 130 connects the primary distributing device 140. The primary distributing device 140 connects the optical fiber network 150. The optical fiber network 150 connects the remote antenna device 160. The remote antenna device 160 connects the electrical signal transmitting line 170. The electrical signal transmitting line 170 connects the antenna 180.

With respect to operations, the wireless front-end device 110 is configured to receive a radio frequency signal. The optical-electrical convertor 120 is configured to receive and transform the radio frequency signal into an optical signal, and transmit the optical signal to the optical-electrical convertor 141 of the primary distributing device 140 through the optical fiber network 130. The optical-electrical convertor 141 is configured to receive and transform the optical signal into the radio frequency signal. The radio frequency processor 143 is configured to receive and transform the radio frequency signal into the electrical signal, and transmit the electrical signal to the optical-electrical convertor 145 in the primary distributing device terminal. In addition, the radio frequency processor 143 is further configured to receive and process the radio frequency signal (e.g., the process is amplifying, filtering, dividing, coupling, and so on). The optical-electrical convertor 145 in the primary distributing device terminal is configured to perform an optical-electrical conversion to the electrical signal so as to generate the optical signal, and transmit the optical signal to the antenna terminal optical-electrical convertor 161 of the remote antenna device 160 through the optical fiber network 150. The antenna terminal optical-electrical convertor 161 is configured to receive the optical signal transmitted by the optical fiber network 150 and perform an optical-electrical conversion to the optical signal to form the electrical signal. The remote antenna device 160 performs a radio frequency signal processing to the electrical signal, and the remote antenna device 160 is connected to the antenna 180 through the electrical signal transmitting line 170.

For example, the wireless front-end device 110 and the optical-electrical convertor 120 can be disposed outdoors (e.g., the outer side of the wall of the building 900), the optical-electrical convertor 141 and the radio frequency processor 143 of the primary distributing device 140 can be disposed indoors (e.g., the inner side of the building 900), the elements outdoors and the elements indoors can transmit signals in a bidirectional manner through the optical fiber network 130. Since the wireless radio frequency conversion system 100 adopts the optical-electrical convertors 120, 141, 145, 161 and the optical fiber networks 130, 150 to implement the connections between the elements. Therefore, the elements of the wireless radio frequency conversion system 100 can be disposed on different sides of the wireless radio frequency conversion system 100. As such, the system deployment of the wireless radio frequency conversion system 100 is more flexible and simpler.

Figure 2:
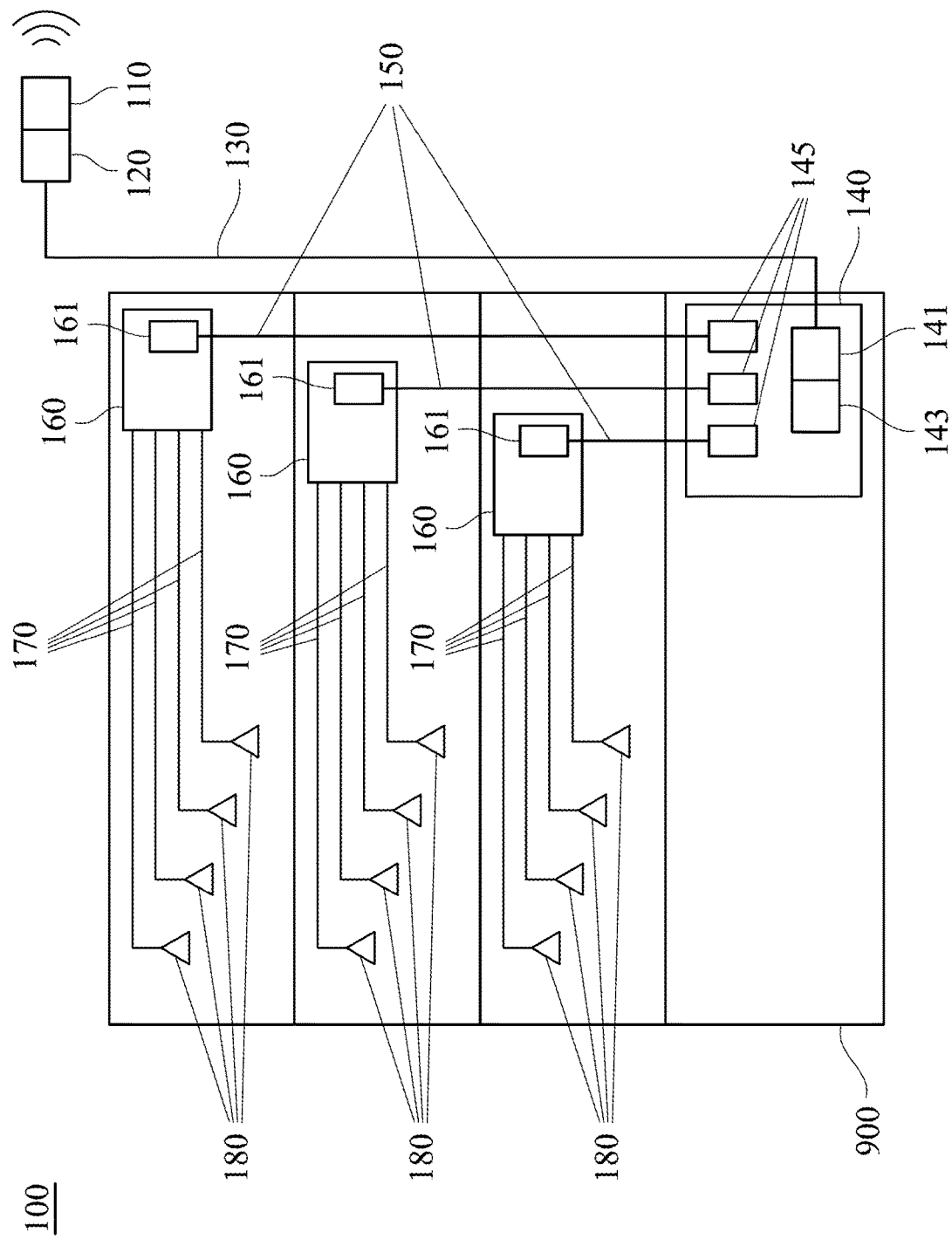
FIG. 2 depicts a schematic diagram of a detailed circuit blocks of the wireless radio frequency conversion system shown in FIG. 1 according to one embodiment of the present disclosure.

FIG. 2 depicts a schematic diagram of a detailed circuit blocks of the wireless radio frequency conversion system 100 shown in FIG. 1 according to one embodiment of the present disclosure. As shown in the figure, the wireless radio frequency conversion system 100 includes a primary distributing device 140, a plurality of optical fiber networks 150, a plurality of remote antenna devices 160, a plurality of electrical signals transmitting lines 170, and a plurality of antennas 180.

With respect to connection, the primary distributing device 140 connects the plurality of optical fiber networks 150. The plurality of optical fiber networks 150 connect the plurality of remote antenna devices 160. The plurality of remote antenna devices 160 connect the plurality of electrical signals transmitting lines 170. The plurality of electrical signals transmitting lines 170 connect the plurality of antennas 180.

With respect to operations, the primary distributing device 140 is configured to receive the first photoelectric signal (e.g., optical signal) from the optical fiber network 130, and perform an optical-electrical conversion and a one-to-many conversion to the first photoelectric signal so as to generate a plurality of second photoelectric signals (e.g., optical signals). The plurality of optical fiber networks 150 are configured to transmit the plurality of second photoelectric signals. The plurality of remote antenna devices 160 are configured to receive and perform an optical-electrical conversion to the plurality of second photoelectric signals from the plurality of optical fiber networks 150 so as to generate a plurality of third photoelectric signals (e.g., electrical signals). The plurality of antennas 180 are configured to receive and wirelessly transmit the plurality of third photoelectric signals from the plurality of electrical signals transmitting lines 170.

In one embodiment, the wireless front-end device 110 of the wireless radio frequency conversion system 100 is configured to receive the radio frequency (RF) signal. The first optical-electrical convertor 120 is configured to receive and transform the radio frequency signal into the optical signal. In another embodiment, the optical fiber network 130 of the wireless radio frequency conversion system 100 is configured to receive and transmit the optical signal from the first optical-electrical convertor 120 to the primary distributing device 140.

In another embodiment, the primary distributing device 140 includes a second optical-electrical convertor 141 and a radio frequency processor 143. The second optical-electrical convertor 141 is configured to receive and transform the optical signal from the optical fiber network 130 into the electrical signal. The radio frequency processor 143 is configured to perform a signal processing to the electrical signal.

In still another embodiment, the radio frequency processor 143 is further configured to process the electrical signal into a plurality of electrical signals, and transmit the plurality of electrical signals to a plurality of optical-electrical convertors 145 of the primary distributing device 140. The plurality of optical-electrical convertors 145 in the primary distributing device terminal are configured to perform an optical-electrical conversion to the plurality of electrical signals so as to generate a plurality of optical signals, and transmit the plurality of optical signals through the plurality of optical fiber networks 150.

In one embodiment, each of the plurality of remote antenna devices 160 includes an antenna terminal optical-electrical convertor 161, and the antenna terminal optical-electrical convertor 161 is configured to receive and perform an optical-electrical conversion to one of the plurality of optical signals from one of the plurality of optical fiber networks 150 so as to generate the electrical signal.

In another embodiment, each of the plurality of remote antenna devices 160 is further configured to perform a signal processing to the electrical signal generated by the antenna terminal optical-electrical convertor 161, the signal processing includes performing the radio frequency signal processing to the electrical signal and performing the one-to-many conversion to the electrical signal, so as to generate a plurality of radio frequency electrical signals, and each of the plurality of remote antenna devices 160 is further configured to transmit the plurality of electrical signals through the plurality of electrical signals transmitting lines 170 to a corresponding antenna of the plurality of antennas 180. The antennas 180 transmit the plurality of electrical signals wirelessly. In addition, the radio frequency signal processing includes amplifying, filtering, dividing, coupling, and so on.

In one embodiment, the wireless front-end device 110 can be a radio frequency (RF) head. The first optical-electrical convertor 120 can be a phototransducer. The optical fiber network 130 can be an optical fiber. The primary distributing device 140 can be a primary distributor. The second optical-electrical convertor 141 can be a phototransducer. The radio frequency processor 143 can be a RF terminal. The optical-electrical convertor 145 in the primary distributing device terminal can be a phototransducer. The optical fiber network 150 can be an optical fiber. The remote antenna device 160 can be a remote antenna system, a RF Power Splitter/Divider, a RF Repeater, or a RF Coupler. The antenna terminal optical-electrical convertor 161 can be a phototransducer. The electrical signal transmitting line 170 can be a cooper cable.

Since the wireless radio frequency conversion system 100 in FIG. 2 adopts the optical-electrical convertors and the optical fiber networks to implement the connections between the elements. Therefore, the elements of the wireless radio frequency conversion system 100 can be disposed on different sides of the wireless radio frequency conversion system 100. As such, the system deployment of the wireless radio frequency conversion system 100 is more flexible and simpler. It is noted that, the present disclosure is not limited to the structure as shown in FIG. 1 and FIG. 2, it is merely an example for illustrating one of the implements of the present disclosure, and the scope of the present disclosure shall be defined on the bases of the claims as shown below.

In view of the foregoing, it is intended that the present disclosure covers modifications and variations to the embodiments of the present disclosure, and modifications and variations to the embodiments of the present disclosure also fall within the scope of the following claims and their equivalents.

Figure 3:
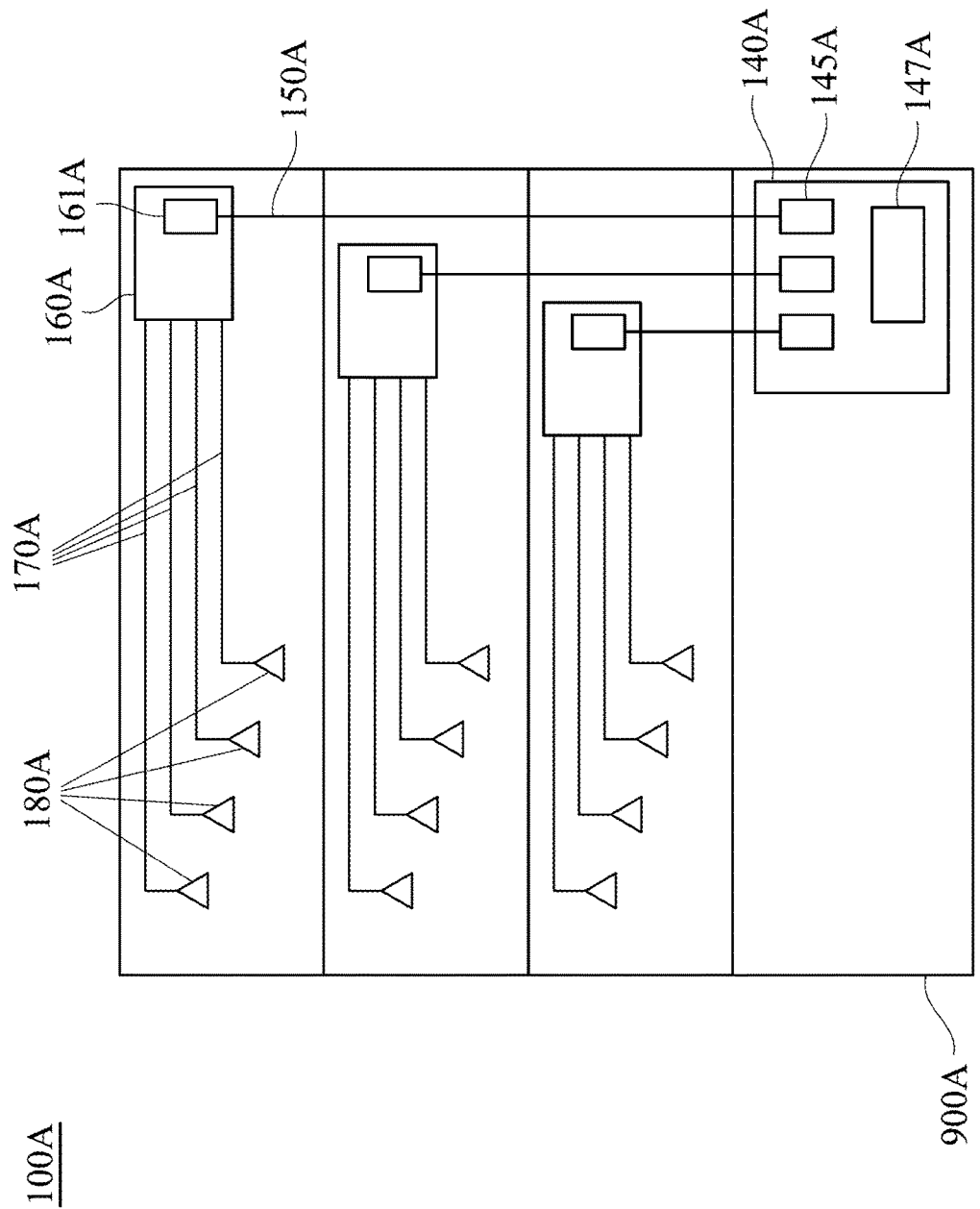
FIG. 3 depicts a schematic diagram of a detailed circuit blocks of the wireless radio frequency conversion system shown in FIG. 1 according to one embodiment of the present disclosure.

FIG. 3 depicts a schematic diagram of a detailed circuit blocks of the wireless radio frequency conversion system 100 shown in FIG. 1 according to one embodiment of the present disclosure. It is noted that, compared with the wireless radio frequency conversion system 100 shown in FIG. 2, the primary distributing device 140A of the wireless radio frequency conversion system 100A shown in FIG. 3 can receive the electrical signal directly from Backhaul fiber through the baseband transceiver 147A, which will be described in detailed as below.

As shown in the figure, the wireless radio frequency conversion system 100A further includes a baseband transceiver 147A, and the baseband transceiver 147A can directly receive and process the electrical signal so as to generate a plurality of electrical signals. In addition, the electrical signal processing includes encoding/decoding, signal multiplexing, baseband/RF signal converting, and so on, and the plurality of electrical signals are generated. The plurality of optical-electrical convertors 145A of the primary distributing device 140A are configured to perform an optical-electrical conversion to the plurality of electrical signals so as to generate a plurality of optical signals, and transmit the plurality of optical signals through the plurality of optical fiber networks 150A to the plurality of remote antenna devices 160A. It is noted that, the element in FIG. 3, whose symbol is similar to the symbol of the element in FIG. 1 and FIG. 2, has similar structure feature in connection with the element in FIG. 1 and FIG. 2. Therefore, a detail description regarding the structure feature of the element in FIG. 3 is omitted herein for the sake of brevity. In addition, the present disclosure is not limited to the structure as shown in FIG. 3, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 4:
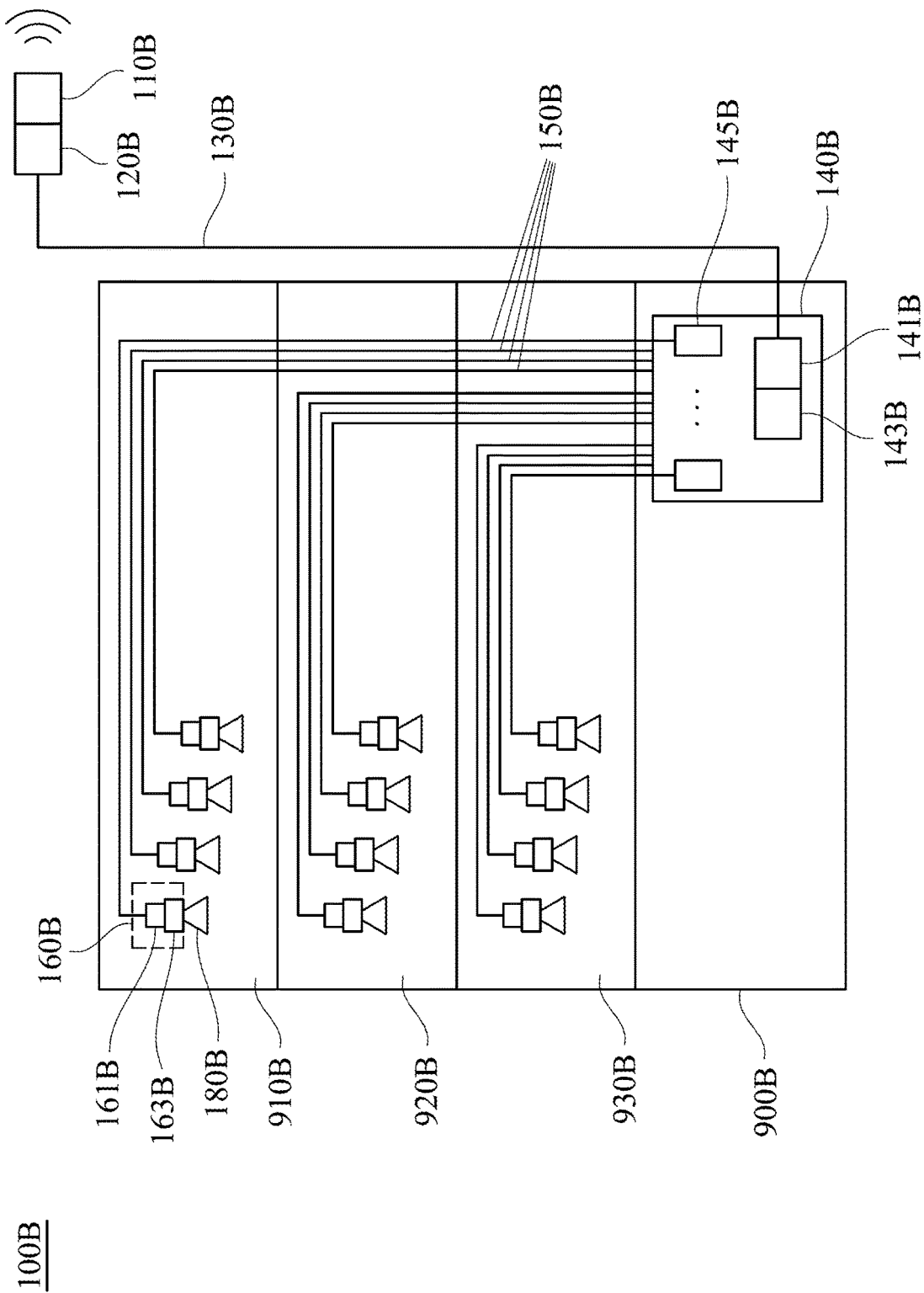
FIG. 4 depicts a schematic diagram of a detailed circuit blocks of the wireless radio frequency conversion system shown in FIG. 1 according to one embodiment of the present disclosure.

FIG. 4 depicts a schematic diagram of a detailed circuit blocks of the wireless radio frequency conversion system 100 shown in FIG. 1 according to one embodiment of the present disclosure. It is noted that, compared with the wireless radio frequency conversion system 100 shown in FIG. 2, the disposition of the optical-electrical convertor 145B in the primary distributing device terminal, the optical fiber network 150B, and the plurality of remote antenna devices 160B of the wireless radio frequency conversion system 100B shown in FIG. 4 is different, which will be described in detailed as below.

As shown in the figure, the wireless radio frequency conversion system 100B includes a plurality of optical-electrical convertors 145B in the primary distributing device terminal, and the plurality of optical-electrical convertors 145B in the primary distributing device terminal are configured to perform an optical-electrical conversion to a plurality of electrical signals so as to generate a plurality of optical signals, and transmit the plurality of optical signals through the plurality of optical fiber networks 150B. For example, four optical-electrical convertors 145B in the primary distributing device terminal of the wireless radio frequency conversion system 100B respectively transmit single signal through the optical fiber networks 150B to the antenna terminal optical-electrical convertor 161B of four remote antenna device 160B which is disposed on the top floor 910B of the building 900B. As such, since the wireless radio frequency conversion system 100B in FIG. 4 can transmits single signal through single optical-electrical convertor 145B in the primary distributing device terminal, single optical fiber network 150B, and single remote antenna device 160B to the top floor 910B of the building 900B, the user on the top floor 910B of the building 900B can receive signal with high quality.

The antenna terminal optical-electrical convertor 161B of the plurality of remote antenna devices 160B is configured to receive and perform an optical-electrical conversion to the plurality of optical signals from the plurality of optical fiber networks 150B so as to generate the plurality of electrical signals. The plurality of front-end processors 163B are configured to perform a signal processing to the plurality of electrical signals, and transmit the plurality of electrical signals to the plurality of antennas 180B. The plurality of antennas 180B wirelessly transmit the plurality of electrical signals wirelessly. In one embodiment, the front-end processor 163B can be a Front-End Module (FEM).

Since the wireless radio frequency conversion system 100B in FIG. 4 adopts the optical-electrical convertors and the optical fiber networks to implement the connections between the elements. Therefore, the elements of the wireless radio frequency conversion system 100B can be disposed on different sides of the wireless radio frequency conversion system 100B. As such, the system deployment of the wireless radio frequency conversion system 100B is more flexible and simpler. It is noted that, the element in FIG. 4, whose symbol is similar to the symbol of the element in FIG. 1 and FIG. 2, has similar structure feature in connection with the element in FIG. 1 and FIG. 2. Therefore, a detail description regarding the structure feature of the element in FIG. 4 is omitted herein for the sake of brevity. In addition, the present disclosure is not limited to the structure as shown in FIG. 4, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 5:
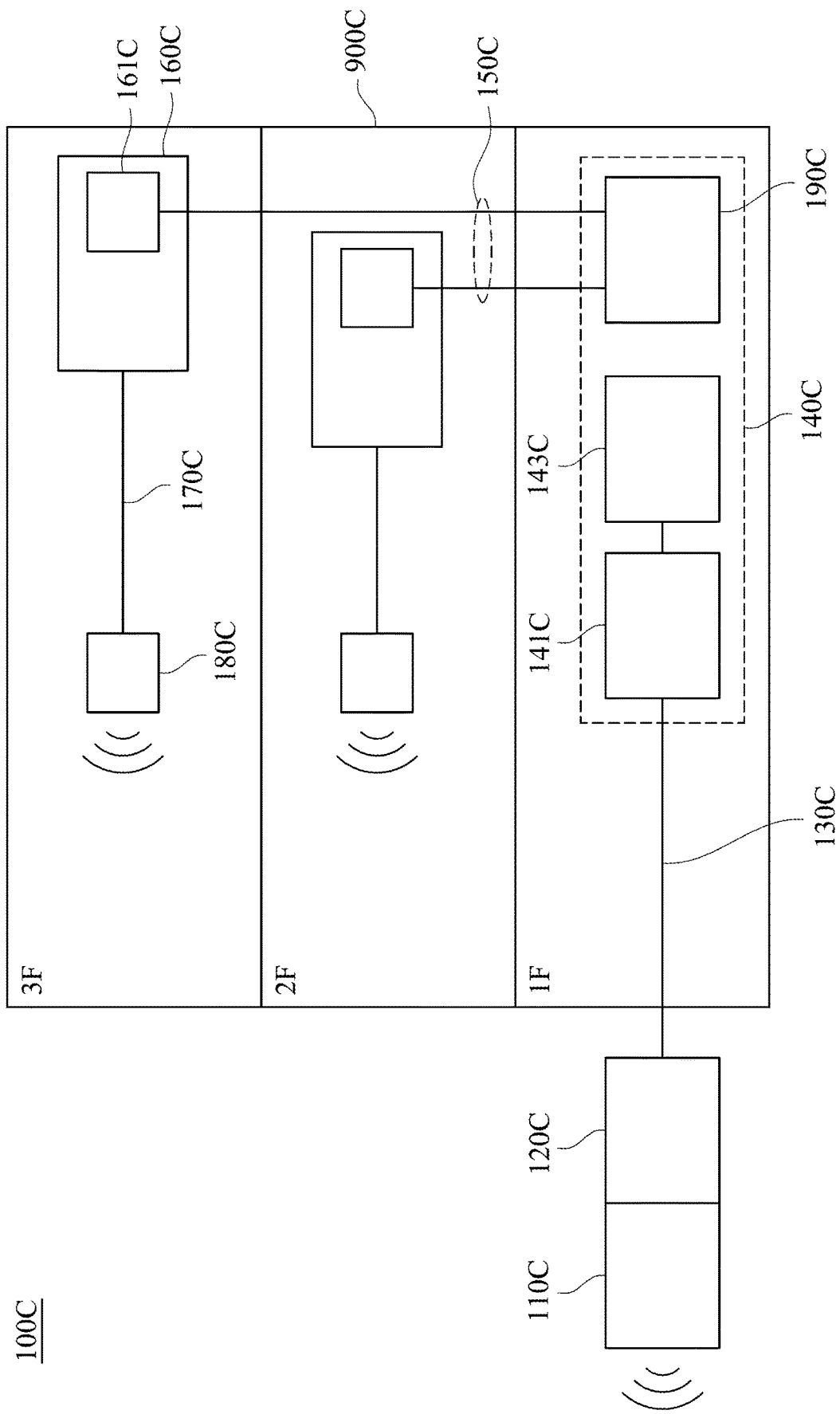
FIG. 5 depicts a schematic diagram of a wireless radio frequency conversion system according to one embodiment of the present disclosure.

FIG. 5 depicts a schematic diagram of a wireless radio frequency conversion system 100C according to one embodiment of the present disclosure. It is noted that, compared with the wireless radio frequency conversion system 100 shown in FIG. 1, the disposition of the primary distributing device 140C and the optical fiber network 150C of the wireless radio frequency conversion system 100C shown in FIG. 5 is different, which will be described in detailed as below.

As shown in the figure, the primary distributing device 140C of the wireless radio frequency conversion system 100C is configured to receive or transmit the optical signal. The one-to-many conversion device 190C is configured to receive and perform an optical-electrical conversion and a one-to-many conversion to the electrical signal outputted by the radio frequency processor 143C so as to generate a plurality of optical signals, and transmit the plurality of optical signals to the plurality of remote antenna devices 160C through the plurality of optical fiber networks 150C so as to perform the following signal processing. Since the wireless radio frequency conversion system 100C in FIG. 5 adopts the optical-electrical convertors and the optical fiber networks to implement the connections between the elements. Therefore, the elements of the wireless radio frequency conversion system 100C can be disposed on different sides of the wireless radio frequency conversion system 100C, and the one-to-many conversion device 190C is configured to perform a one-to-many conversion to the optical signals so as to transmit the optical signals to different floors of the building 900C. As such, the system deployment of the wireless radio frequency conversion system 100C is more flexible and simpler. It is noted that, the element in FIG. 5, whose symbol is similar to the symbol of the element in FIG. 1, has similar structure feature in connection with the element in FIG. 1. Therefore, a detail description regarding the structure feature of the element in FIG. 5 is omitted herein for the sake of brevity. In addition, the present disclosure is not limited to the structure as shown in FIG. 5, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 6:
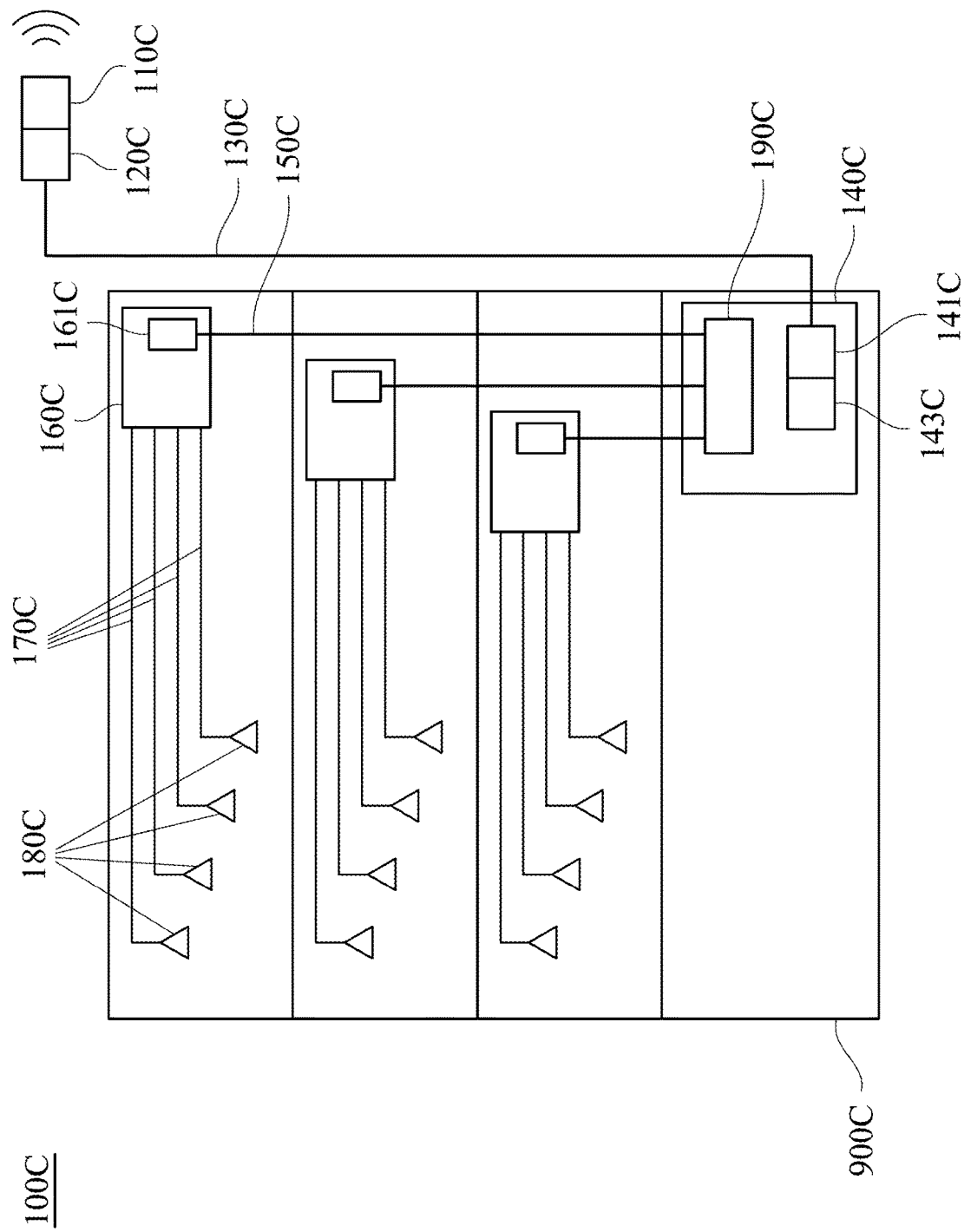
FIG. 6 depicts a schematic diagram of a detailed circuit blocks of the wireless radio frequency conversion system shown in FIG. 5 according to one embodiment of the present disclosure.

FIG. 6 depicts a schematic diagram of a detailed circuit blocks of the wireless radio frequency conversion system 100C shown in FIG. 5 according to one embodiment of the present disclosure. As shown in the figure, wireless radio frequency conversion system 100C includes a primary distributing device 140C, a one-to-many conversion device 190C, a plurality of optical fiber networks 150C, a plurality of remote antenna devices 160C, a plurality of electrical signals transmitting lines 170C, and a plurality of antennas 180C.

With respect to connection, the one-to-many conversion device 190C connects the plurality of optical fiber networks 150C. The plurality of optical fiber networks 150C connect the plurality of remote antenna devices 160C. The plurality of remote antenna devices 160C connect the plurality of electrical signals transmitting lines 170C. The plurality of electrical signals transmitting lines 170C connect the plurality of antennas 180C.

With respect to operations, the primary distributing device 140C is configured to receive the first photoelectric signal (e.g., optical signal) from the optical fiber network 130C. The one-to-many conversion device 190C is configured to perform an optical-electrical conversion and a one-to-many conversion to the first photoelectric signal so as to generate a plurality of second photoelectric signals (e.g., optical signals). The plurality of optical fiber networks 150C are configured to transmit the plurality of second photoelectric signals. The plurality of remote antenna devices 160C are configured to receive and perform an optical-electrical conversion to the plurality of second photoelectric signals from the plurality of optical fiber networks 150C so as to generate a plurality of third photoelectric signals (e.g., electrical signal). In addition, the optical-electrical conversion and the signal processing include amplifying, filtering, dividing, coupling, and so on. The plurality of antennas 180C are configured to receive and wirelessly transmit the plurality of third photoelectric signals from the plurality of electrical signals transmitting lines 170C.

On the other hand, the primary distributing device 140C is configured to receive or transmit the first photoelectric signal (e.g., optical signal). The one-to-many conversion device 190C is configured to perform an optical-electrical conversion and a one-to-many conversion to the first photoelectric signal so as to generate the plurality of second photoelectric signals, or perform an optical-electrical conversion and a many-to-one conversion to the plurality of second photoelectric signals so as to generate the first photoelectric signal. The plurality of remote antenna devices 160C are configured to perform an optical-electrical conversion between the plurality of second photoelectric signals and the plurality of third photoelectric signals. The plurality of antennas 180C are configured to receive or transmit the plurality of third photoelectric signals.

In one embodiment, the wireless front-end device 110C of the wireless radio frequency conversion system 100C is configured to receive radio frequency (RF) signal. The first optical-electrical convertor 120C is configured to receive and transform the radio frequency signal into the first photoelectric signal, and the first photoelectric signal can be the optical signal. In another embodiment, the wireless radio frequency conversion system 100C further includes an optical fiber network 130C, and the optical fiber network 130C is configured to receive and transmit the first photoelectric signal from the first optical-electrical convertor 120C to the primary distributing device 140C. On the other hand, the wireless front-end device 110C of the wireless radio frequency conversion system 100C is configured to receive or transmit the radio frequency signal. The first optical-electrical convertor 120C is configured to perform an optical-electrical conversion between the radio frequency signal and the first photoelectric signal. The first photoelectric signal is the optical signal. The optical fiber network 130C of the wireless radio frequency conversion system 100C is configured to transmit the first photoelectric signal.

In another embodiment, the primary distributing device 140C includes a second optical-electrical convertor 141C and a radio frequency processor 143C. The second optical-electrical convertor 141C is configured to receive and transform the first photoelectric signal from the optical fiber network 130C into the first electrical signal. The radio frequency processor 143C is configured to perform a signal processing to the first electrical signal. In addition, the signal processing includes amplifying, filtering, dividing, coupling, and so on. On the other hand, the second optical-electrical convertor 141C of the primary distributing device 140C is configured to perform an optical-electrical conversion between the first photoelectric signal and the first electrical signal.

In still another embodiment, the one-to-many conversion device 190C is configured to perform an optical-electrical conversion and a one-to-many conversion to the first electrical signal so as to generate a plurality of second photoelectric signals, and transmit the plurality of second photoelectric signals through the plurality of optical fiber networks 150C to the plurality of remote antenna devices 160C, and the plurality of second photoelectric signals can be the optical signal. On the other hand, the one-to-many conversion device 190C is configured to perform an optical-electrical conversion and a one-to-many conversion to the first electrical signal so as to generate the plurality of second photoelectric signals, or perform an optical-electrical conversion and a many-to-one conversion to the plurality of second photoelectric signals so as to generate the first electrical signal. The plurality of second photoelectric signals are the optical signals. The optical fiber network 150C of the wireless radio frequency conversion system 100C is configured to transmit the plurality of second photoelectric signals.

In one embodiment, each of the plurality of remote antenna devices 160C include an antenna terminal optical-electrical convertor 161C, and the antenna terminal optical-electrical convertor 161C is configured to receive and perform an optical-electrical conversion to one of the plurality of second photoelectric signals from one of the plurality of optical fiber networks 150C so as to generate the second electrical signal. On the other hand, the antenna terminal optical-electrical convertor 161C of the plurality of remote antenna devices 160C is configured to perform an optical-electrical conversion between one of the plurality of second photoelectric signals and the plurality of third photoelectric signals. The plurality of third photoelectric signals are the electrical signals.

In another embodiment, each of the plurality of remote antenna devices 160C are configured to perform a signal processing to the second electrical signal generated by the antenna terminal optical-electrical convertor 161C, and the signal processing includes performing the radio frequency signal processing and the electrical signal one-to-many conversion to the electrical signal, so as to generate a plurality of third photoelectric signals, and transmit the plurality of third photoelectric signals through the plurality of electrical signals transmitting lines 170C to a corresponding antenna of the plurality of antennas 180C. The antenna 180C wirelessly transmits the radio frequency signal.

Since the wireless radio frequency conversion system 100C in FIG. 6 adopts the optical-electrical convertors and the optical fiber networks to implement the connections between the elements. Therefore, the elements of the wireless radio frequency conversion system 100C can be disposed on different sides of the wireless radio frequency conversion system 100C. As such, the system deployment of the wireless radio frequency conversion system 100C is more flexible and simpler. It is noted that, the present disclosure is not limited to the structure as shown in FIG. 5 and FIG. 6, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 7:
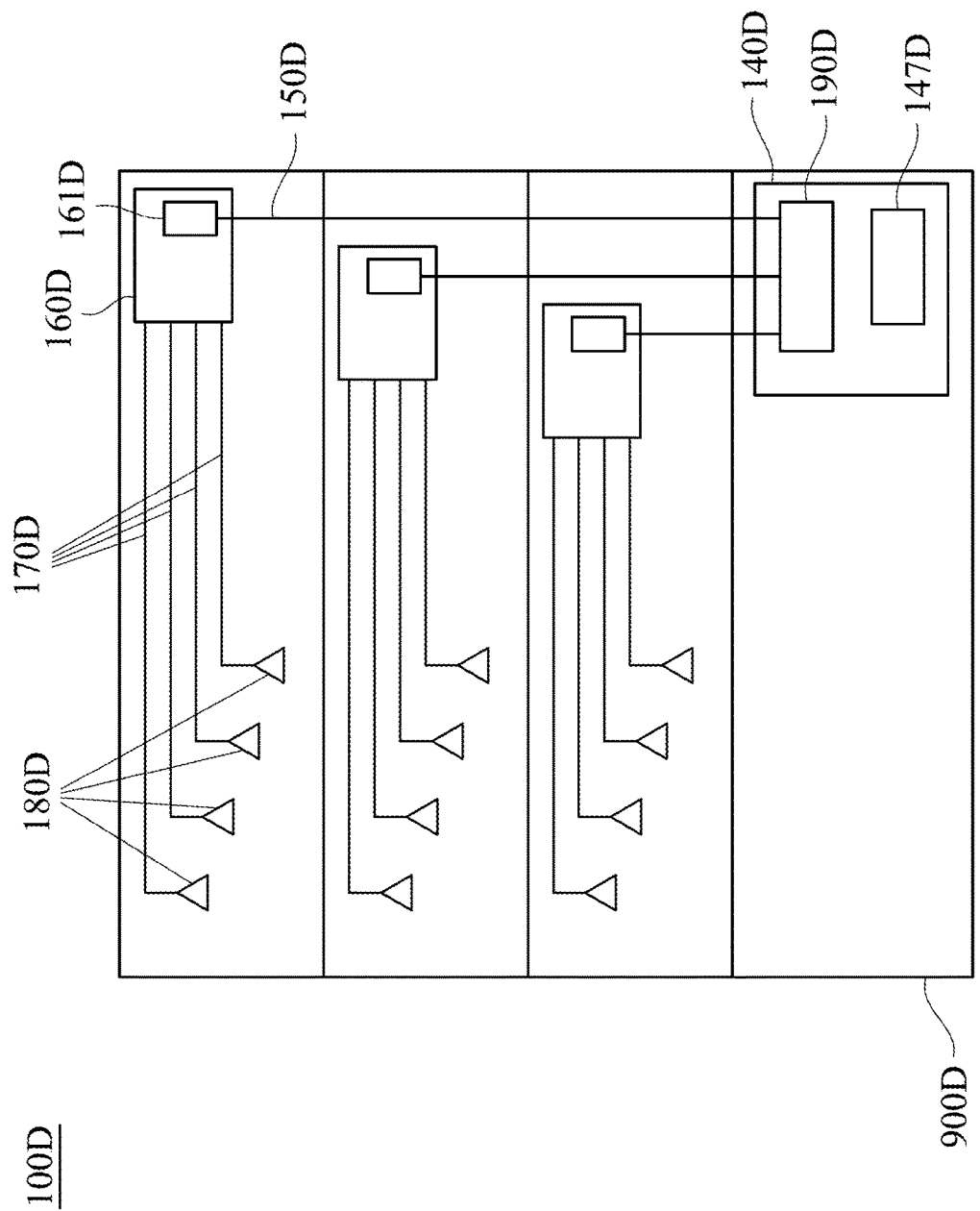
FIG. 7 depicts a schematic diagram of a detailed circuit blocks of the wireless radio frequency conversion system shown in FIG. 5 according to one embodiment of the present disclosure.

FIG. 7 depicts a schematic diagram of a detailed circuit blocks of the wireless radio frequency conversion system 100C shown in FIG. 5 according to one embodiment of the present disclosure. It is noted that, compared with the wireless radio frequency conversion system 100C shown in FIG. 6, the primary distributing device 140D of the wireless radio frequency conversion system 100D shown in FIG. 7 can receive the electrical signal directly from the Backhaul fiber through the baseband transceiver 147D, which will be described in detailed as below.

As shown in the figure, the wireless radio frequency conversion system 100D further includes a baseband transceiver 147D, and the baseband transceiver 147D can directly receive and process the electrical signal. In addition, the electrical signal processing includes encoding/decoding, signal multiplexing, baseband/radio frequency signal, converting, and so on. The one-to-many conversion device 190D is configured to perform an optical-electrical conversion and a one-to-many conversion to the electrical signal so as to generate a plurality of optical signals, and transmit the plurality of optical signals through the plurality of optical fiber networks 150D to the plurality of remote antenna devices 160D. On the other hand, the one-to-many conversion device 190D receive the plurality of optical signals through the plurality of optical fiber networks 150D, configured to perform an optical-electrical conversion and a many-to-one conversion to the plurality of optical signals so as to generate the electrical signal, and transmit the electrical signal to the baseband transceiver 147D. In one embodiment, the baseband transceiver 147D can be a Base Transceiver Station (BTS). It is noted that, the element in FIG. 7, whose symbol is similar to the symbol of the element in FIG. 5 and FIG. 6, has similar structure feature in connection with the element in FIG. 5 and FIG. 6. Therefore, a detail description regarding the structure feature of the element in FIG. 7 is omitted herein for the sake of brevity. In addition, the present disclosure is not limited to the structure as shown in FIG. 7, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 8:
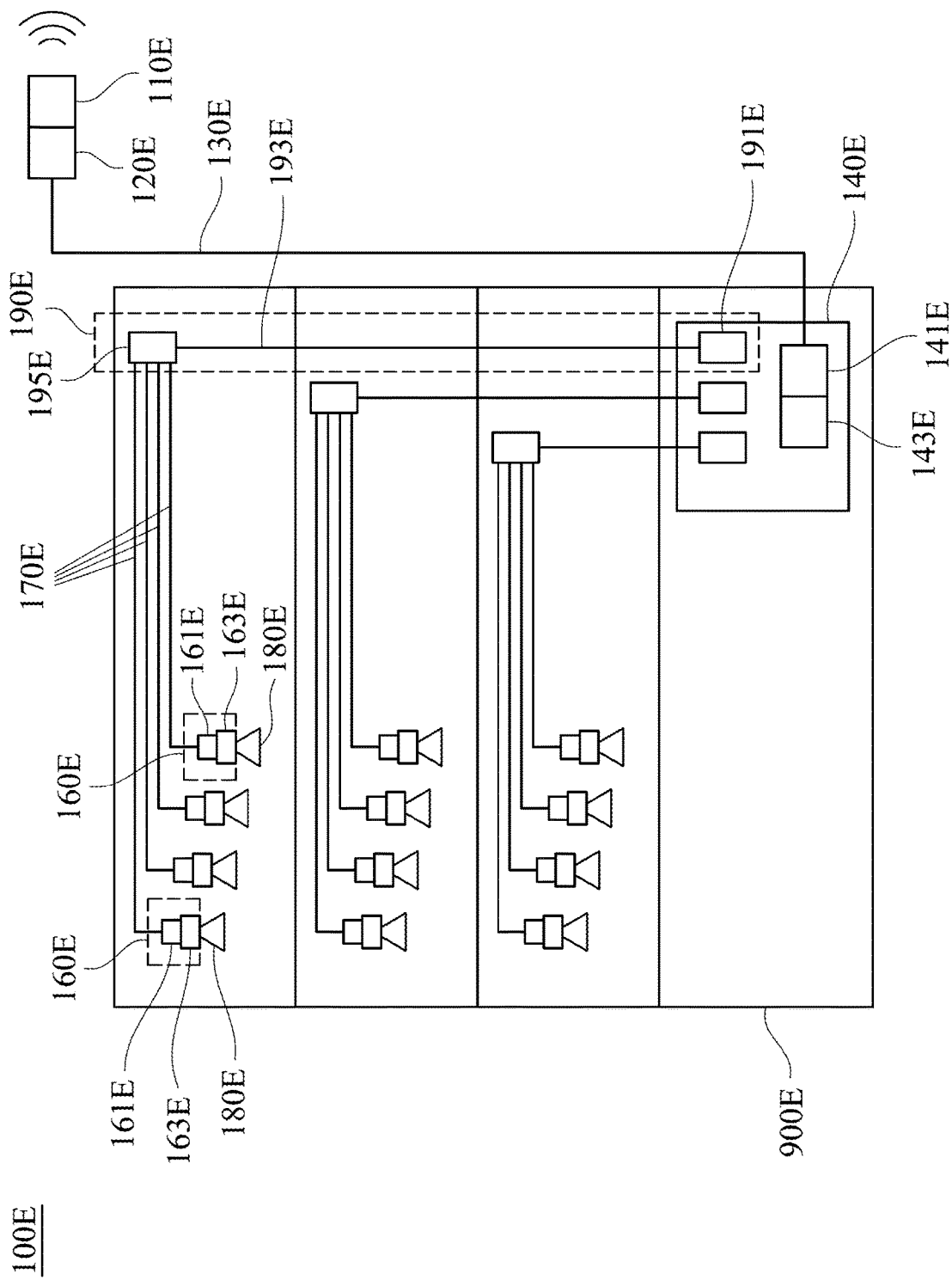
FIG. 8 depicts a schematic diagram of a detailed circuit blocks of the wireless radio frequency conversion system shown in FIG. 5 according to one embodiment of the present disclosure.

FIG. 8 depicts a schematic diagram of a detailed circuit blocks of the wireless radio frequency conversion system 100C shown in FIG. 5 according to one embodiment of the present disclosure. It is noted that, compared with the wireless radio frequency conversion system 100C shown in FIG. 6, the primary distributing device 140E and the plurality of remote antenna devices 160E of the wireless radio frequency conversion system 100E shown in FIG. 8 is different, which will be described in detailed as below.

As shown in the figure, the primary distributing device 140E includes a second optical-electrical convertor 141E and a radio frequency processor 143E. The second optical-electrical convertor 141E is configured to receive and transform the first photoelectric signal from the optical fiber network 130E into the first electrical signal. The radio frequency processor 143E is configured to perform a signal processing to the first electrical signal, and distribute the first electrical signal into a plurality of first sub-photoelectric signals. On the other hand, the radio frequency processor 143E distributes the first electrical signal into a plurality of first sub-photoelectric signals, or processes the plurality of first sub-photoelectric signals into the first electrical signal.

In one embodiment, the one-to-many conversion device 190E of the wireless radio frequency conversion system 100E includes a third optical-electrical convertor 191E, an optical fiber network 193E, and a one-to-many distributing device 195E. The optical fiber network 193E is configured to connect the third optical-electrical convertor 191E and the one-to-many distributing device 195E. The third optical-electrical convertor 191E is configured to receive and perform an optical-electrical conversion to one of the plurality of first sub-photoelectric signals from the radio frequency processor 143E so as to generate one of the plurality of second sub-photoelectric signals, and the plurality of second sub-photoelectric signals can be the optical signals. The one-to-many distributing device 195E is configured to receive and distribute one of the plurality of second sub-photoelectric signals from the optical fiber network 193E into a plurality of second photoelectric signals. On the other hand, the third optical-electrical convertor 191E of the one-to-many conversion device 190E is configured to perform an optical-electrical conversion to one of the plurality of first sub-photoelectric signals and one of the plurality of second sub-photoelectric signals. The plurality of second sub-photoelectric signals are the optical signals. The one-to-many distributing device 195E is configured to distribute one of the plurality of second sub-photoelectric signals into the plurality of second photoelectric signals, or process the plurality of second photoelectric signals into one of the plurality of second sub-photoelectric signals.

In another embodiment, each of the plurality of remote antenna devices 160E includes an antenna terminal optical-electrical convertor 161E and a front-end processor 163E. The antenna terminal optical-electrical convertor 161E is configured to receive and perform an optical-electrical conversion to one of the plurality of second photoelectric signals from the plurality of electrical signals transmitting lines 170E so as to generate one of the plurality of third photoelectric signals. Each of the front-end processors 163E is configured to perform a signal processing to one of the plurality of third photoelectric signals and transmit one of the plurality of third photoelectric signals to one of the plurality of antennas 180E. The plurality of antennas 180E wirelessly transmits the plurality of third photoelectric signals. In one embodiment, the front-end processor 163E can be a Front-End Module (FEM). On the other hand, the antenna terminal optical-electrical convertor 161E of the plurality of remote antenna devices 160E is configured to perform an optical-electrical conversion to one of the plurality of second photoelectric signals and one of the plurality of third photoelectric signals. The front-end processor 163E is configured to perform a signal processing to one of the plurality of third photoelectric signals and the radio frequency signal.

Since the wireless radio frequency conversion system 100E in FIG. 8 adopts the optical-electrical convertors and the optical fiber networks to implement the connections between the elements. Therefore, the elements of the wireless radio frequency conversion system 100E can be disposed on different sides of the wireless radio frequency conversion system 100E. As such, the system deployment of the wireless radio frequency conversion system 100E is more flexible and simpler. It is noted that, the element in FIG. 8, whose symbol is similar to the symbol of the element in FIG. 5 and FIG. 6, has similar structure feature in connection with the element in FIG. 5 and FIG. 6. Therefore, a detail description regarding the structure feature of the element in FIG. 8 is omitted herein for the sake of brevity. In addition, the present disclosure is not limited to the structure as shown in FIG. 8, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 9:
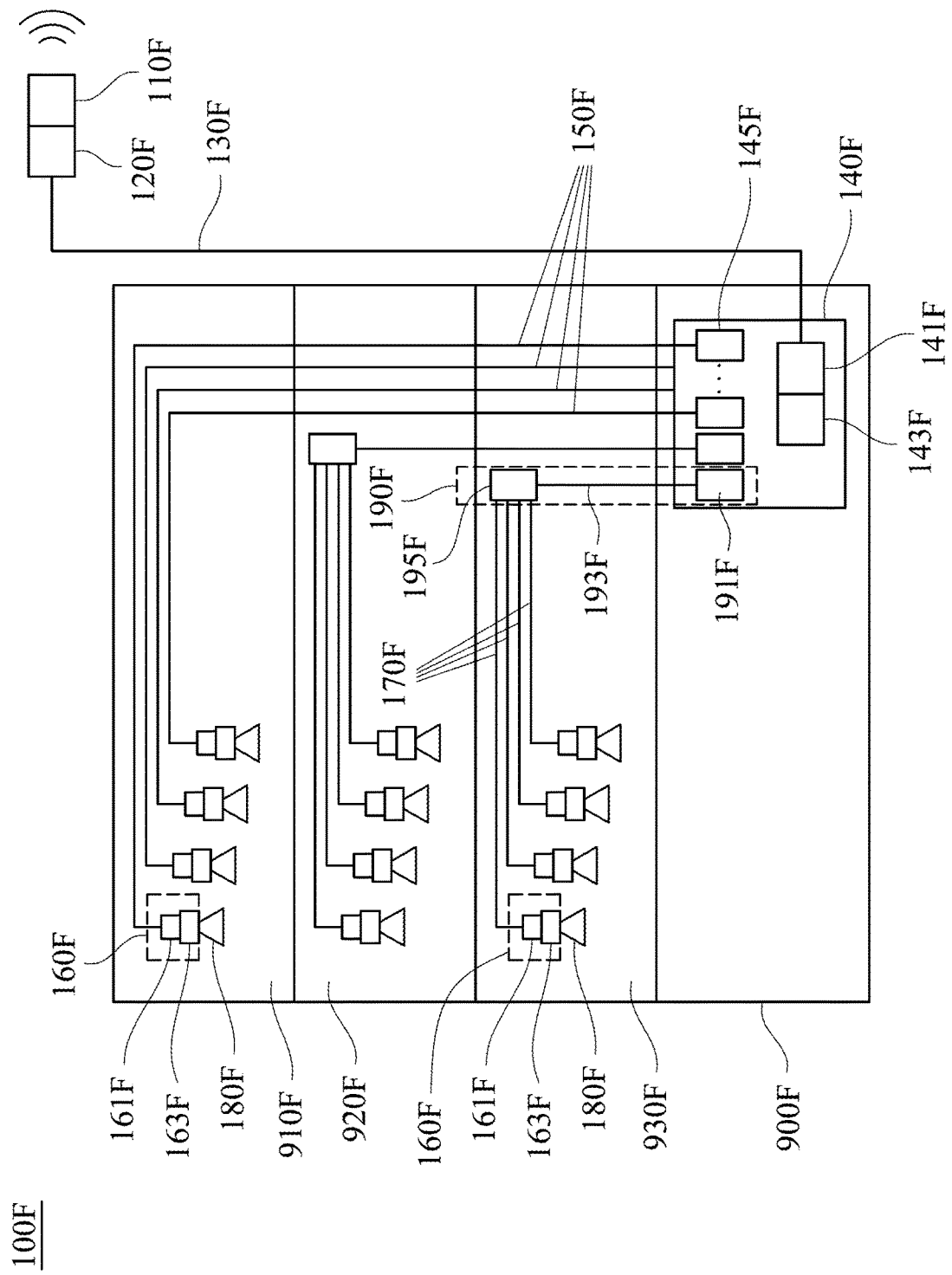
FIG. 9 depicts a schematic diagram of a detailed circuit blocks of the wireless radio frequency conversion system shown in FIG. 5 according to one embodiment of the present disclosure.

FIG. 9 depicts a schematic diagram of a detailed circuit blocks of the wireless radio frequency conversion system 100C shown in FIG. 5 according to one embodiment of the present disclosure. It is noted that, compared with the wireless radio frequency conversion system 100E shown in FIG. 8, the disposition of the primary distributing device 140F, the optical fiber network 150F, and the plurality of remote antenna devices 160F of the wireless radio frequency conversion system 100F shown in FIG. 9 is different, which will be described in detailed as below.

As shown in the figure, the wireless radio frequency conversion system 100F includes a plurality of optical-electrical convertors 145F in the primary distributing device terminal. The plurality of optical-electrical convertors 145F in the primary distributing device terminal are configured to perform an optical-electrical conversion to a plurality of first sub-photoelectric signals so as to generate a plurality of optical signals, and transmit the plurality of optical signals through the plurality of optical fiber networks 150F. For example, four optical-electrical convertors 145F in the primary distributing device terminal of the wireless radio frequency conversion system 100F respectively transmit single signal through the optical fiber networks 150F to the antenna terminal optical-electrical convertor 161F of the four remote antenna device 160F which is disposed on the top floor 910F of the building 900F. As such, since the wireless radio frequency conversion system 100F in FIG. 9 can transmits single signal through single optical-electrical convertor 145F in the primary distributing device terminal, single optical fiber network 150F, and single remote antenna device 160F to the top floor 910F of the building 900F, the user on the top floor 910F of the building 900F can receive signal with high quality.

In addition, the one-to-many conversion device 190F of the wireless radio frequency conversion system 100F includes a third optical-electrical convertor 191F, an optical fiber network 193F, and a one-to-many distributing device 195F. The optical fiber network 193F is configured to connect the third optical-electrical convertor 191F and the one-to-many distributing device 195F. The third optical-electrical convertor 191F is configured to receive and perform an optical-electrical conversion to one of the plurality of first sub-photoelectric signals from the radio frequency processor 143F so as to generate one of the plurality of second sub-photoelectric signals, and the plurality of second sub-photoelectric signals can be the optical signals. The one-to-many distributing device 195F is configured to receive and distribute one of the plurality of second sub-photoelectric signals from the optical fiber network 193F into the plurality of second photoelectric signals. For example, the floor 930F of the building 900F can receive single signal transmitted from the single optical fiber network 193F, and the one-to-many distributing device 195F distributes the single signal into multiple signals. Therefore, users on the floor 930F of the building 900F can transmit signals through the single optical fiber network 193F, and users do not need a plurality of optical fiber networks for transmitting so as to reduce the cost of the wireless radio frequency conversion system 100F.

Since the wireless radio frequency conversion system 100F in FIG. 9 adopts the optical-electrical convertors and the optical fiber networks to implement the connections between the elements. Therefore, the elements of the wireless radio frequency conversion system 100F can be disposed on different sides of the wireless radio frequency conversion system 100F. As such, the system deployment of the wireless radio frequency conversion system 100F is more flexible and simpler. It is noted that, the element in FIG. 9, whose symbol is similar to the symbol of the element in FIG. 5 and FIG. 6, has similar structure feature in connection with the element in FIG. 5 and FIG. 6. Therefore, a detail description regarding the structure feature of the element in FIG. 9 is omitted herein for the sake of brevity. In addition, the present disclosure is not limited to the structure as shown in FIG. 9, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 10:
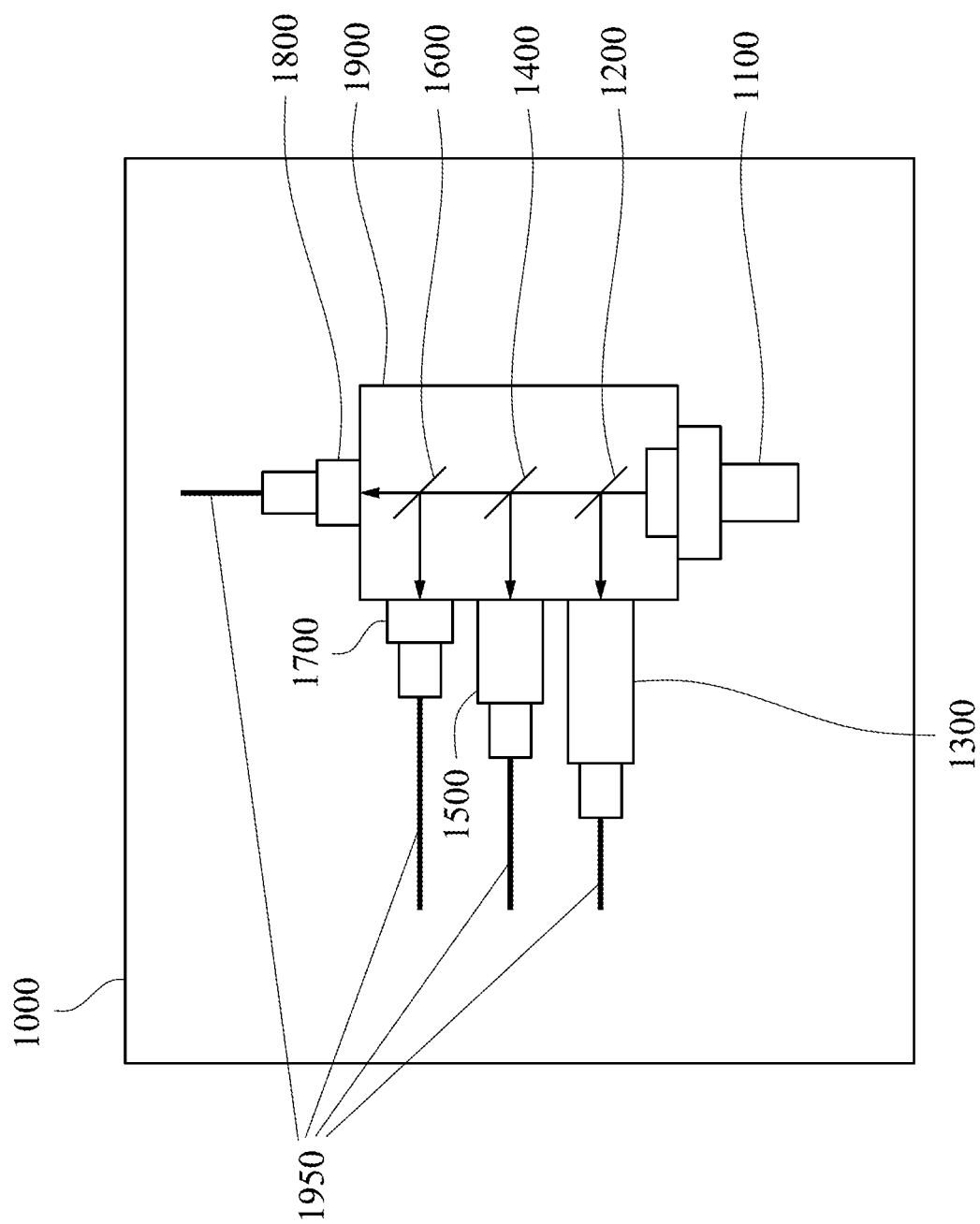
FIG. 10 depicts a schematic diagram of a one-to-many distributing device according to one embodiment of the present disclosure.

FIG. 10 depicts a schematic diagram of a one-to-many distributing device 1000 according to one embodiment of the present disclosure. The one-to-many distributing device 1000 in FIG. 10 is applied in the one-to-many conversion device 190C of the wireless radio frequency conversion system 100C in FIG. 5 and FIG. 6, the one-to-many conversion device 190D of the wireless radio frequency conversion system 100D in FIG. 7, the one-to-many conversion device 190E of the wireless radio frequency conversion system 100E in FIG. 8, and the one-to-many conversion device 190F of the wireless radio frequency conversion system 100F in FIG. 9.

As shown in FIG. 10, the one-to-many distributing device 1000 includes an optical-electrical convertor 1100, a first beamsplitter 1200, a first connector 1300, a second beamsplitter 1400, a second connector 1500, a third beamsplitter 1600, a third connector 1700, and a fourth connector 1800.

With respect to operations, the optical-electrical convertor 1100 is configured to perform an optical-electrical conversion between the electrical signal and the optical signal. The first beamsplitter 1200 is configured to partially reflect the optical signal so as to generate a first reflecting signal, and be partially penetrated by the optical signal so as to generate a first penetrating signal. The first connector 1300 is configured to output the first reflecting signal through the optical fiber network 1950. The second beamsplitter 1400 is configured to partially reflect the first penetrating signal so as to generate a second reflecting signal, and be partially penetrated by the first penetrating signal so as to generate a second penetrating signal. The second connector 1500 is configured to output the second reflecting signal through the optical fiber network 1950.

In addition, the third beamsplitter 1600 of the one-to-many distributing device 1000 is configured to partially reflect the second penetrating signal so as to generate a third reflecting signal, and be partially penetrated by the second penetrating signal so as to generate a third penetrating signal. The third connector 1700 is configured to output the third reflecting signal through the optical fiber network 1950. The fourth connector 1800 is configured to output the third penetrating signal through the optical fiber network 1950. As such, owing to the operations of the one-to-many distributing device 1000, single optical signal inputted by the optical-electrical convertor 1100 can be distributed into a plurality of optical signals, and the plurality of optical signals can be outputted by the first connector 1300, the second connector 1500, the third connector 1700, and the fourth connector 1800 through the optical fiber network 1950.

In one embodiment, the optical-electrical convertor 1100 includes a laser diode package structure (TO-can), and the laser diode package structure 1100 is configured to convert the electrical signal into the optical signal. The one-to-many distributing device 1000 further includes a housing 1900. The first beamsplitter 1200, the second beamsplitter 1400, and the third beamsplitter 1600 are disposed inside the housing 1900, and the laser diode package structure 1100, the first connector 1300, the second connector 1500, the third connector 1700, and the fourth connector 1800 are disposed outside the housing 1900 and attached to the housing 1900. It is noted that, the present disclosure is not limited to the structure as shown in FIG. 10, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 11:
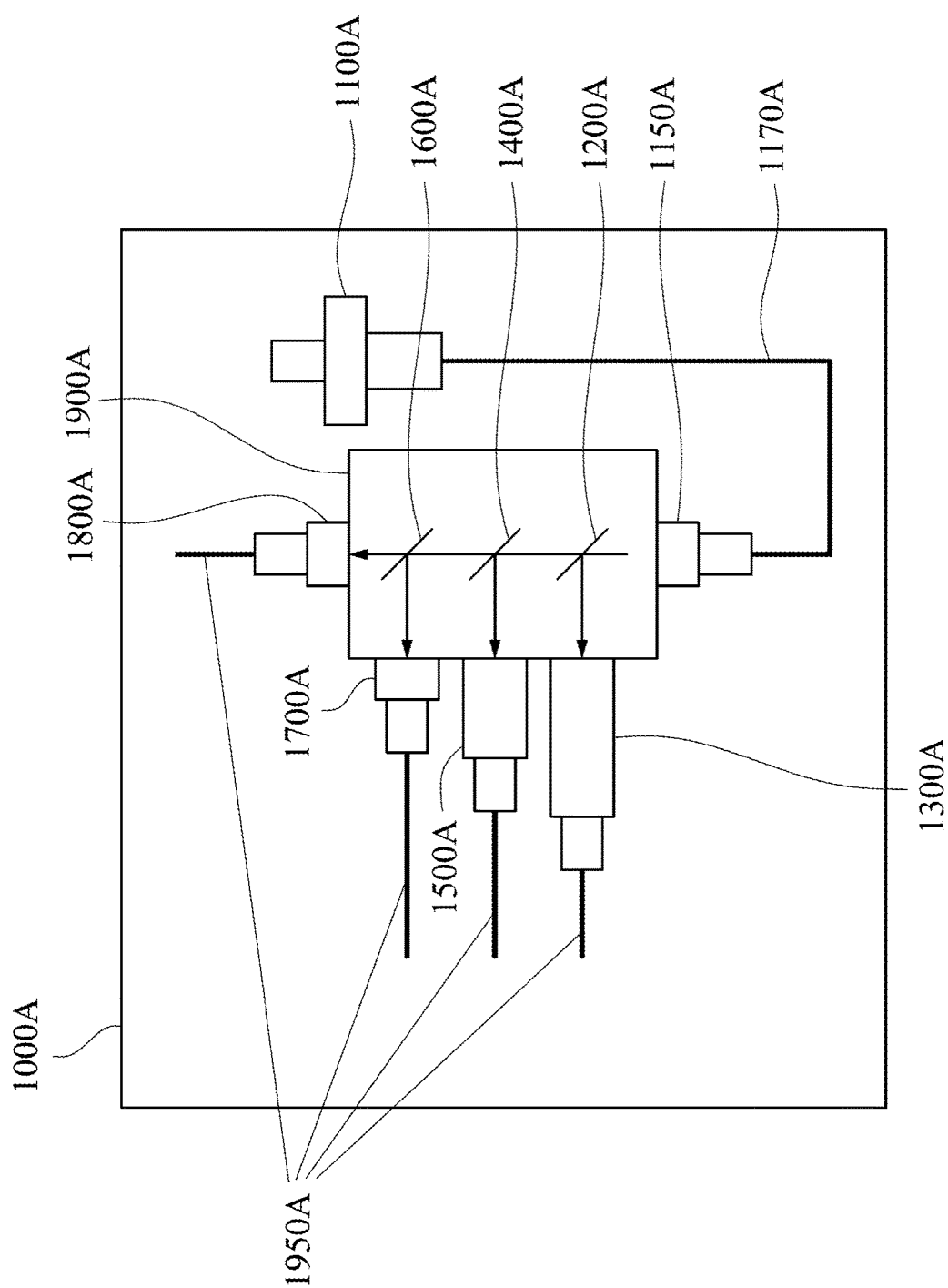
FIG. 11 depicts a schematic diagram of a one-to-many distributing device according to one embodiment of the present disclosure.

FIG. 11 depicts a schematic diagram of a one-to-many distributing device 1000A according to one embodiment of the present disclosure. It is noted that, compared with the wireless radio frequency conversion system 1000 shown in FIG. 10, the optical-electrical convertor 1100A of the wireless radio frequency conversion system 1000A shown in FIG. 11 is different, which will be described in detailed as below.

As shown in the figure, the optical-electrical convertor 1100A includes a laser diode package structure, and the laser diode package structure 1100A is configured to convert the electrical signal into the optical signal. The one-to-many distributing device 1000A further includes a fifth connector 1150A and a housing 1900A. The fifth connector 1150A is coupled to the laser diode package structure 1100A, and configured to receive the optical signal from the laser diode package structure 1100A. The first beamsplitter 1200A, the second beamsplitter 1400A, and the third beamsplitter 1600A are disposed inside the housing 1900A, and the first connector 1300A, the second connector 1500A, the third connector 1700A, the fourth connector 1800A, and the fifth connector 1150A are disposed outside the housing 1900A and attached to the housing 1900A.

In still another embodiment, the one-to-many distributing device 1000A further includes an optical fiber 1170A. The optical fiber 1170A is coupled between the fifth connector 1150A and the laser diode package structure 1100A, and configured to transmit the optical signal. It is noted that, the element in FIG. 11, whose symbol is similar to the symbol of the element in FIG. 10, has similar structure feature in connection with the element in FIG. 10. Therefore, a detail description regarding the structure feature of the element in FIG. 11 is omitted herein for the sake of brevity. In addition, the present disclosure is not limited to the structure as shown in FIG. 11, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 12:
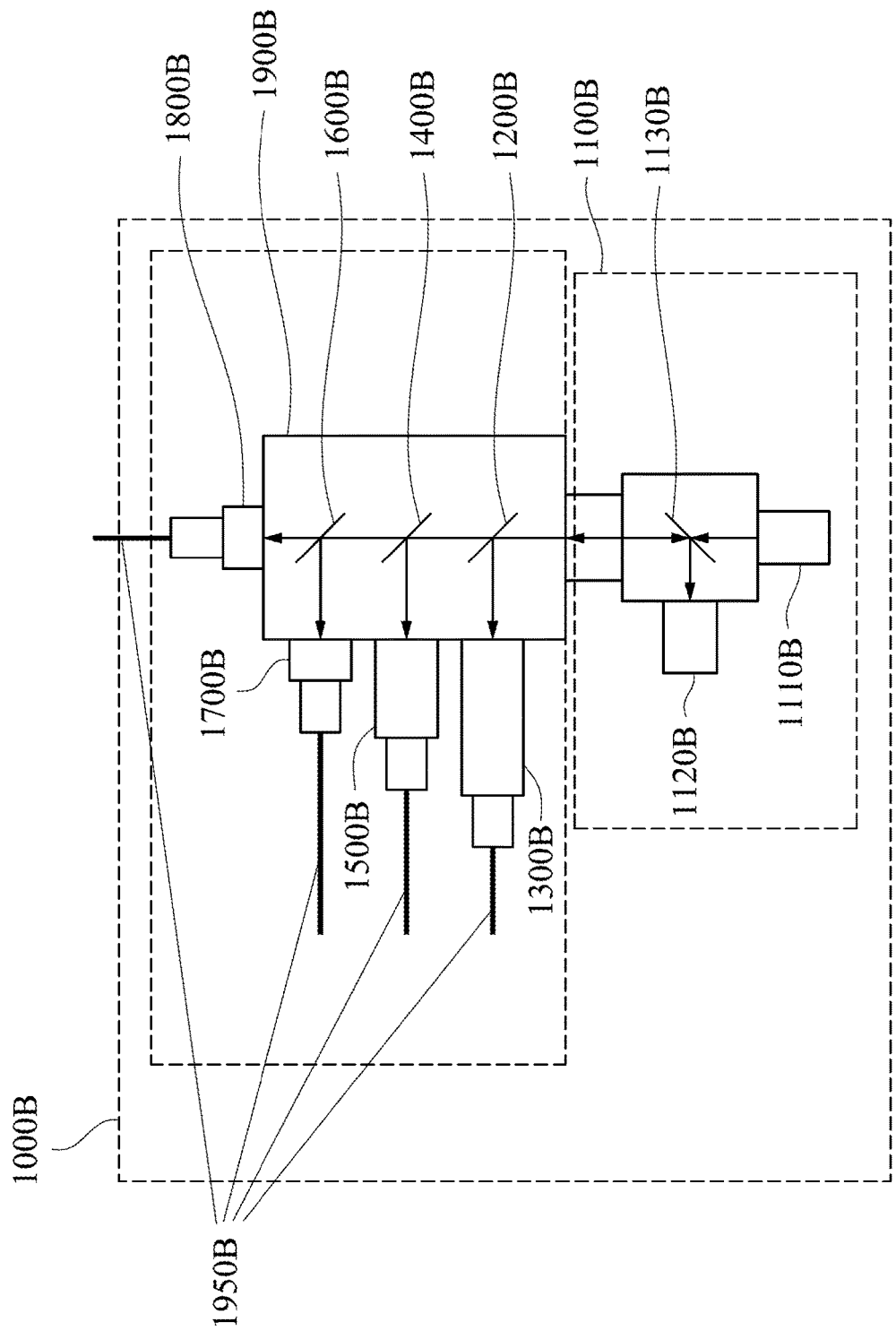
FIG. 12 depicts a schematic diagram of a one-to-many distributing device according to one embodiment of the present disclosure.

FIG. 12 depicts a schematic diagram of a one-to-many distributing device 1000B according to one embodiment of the present disclosure. It is noted that, compared with the wireless radio frequency conversion system 1000 shown in FIG. 10, the optical-electrical convertor 1100B of the wireless radio frequency conversion system 1000B shown in FIG. 12 is different, which will be described in detailed as below.

As shown in the figure, the optical-electrical convertor 1100B includes a bidirectional optical transceiver, and the bidirectional optical transceiver 1100B includes a laser diode package structure (e.g., Tx TO-can) 1110B, a photodiode package structure (e.g., Rx TO-can) 1120B, and a filter

1130B. The laser diode package structure 1110B is configured to convert the electrical signal into the optical signal. The photodiode package structure 1120B is configured to convert the optical signal into the electrical signal. The filter 1130B is configured to be penetrated by the optical signal of the laser diode package structure 1110B, and configured to reflect the optical signal of the first beamsplitter 1200B to the photodiode package structure 1120B. The one-to-many distributing device 1000B further includes a housing 1900B. The first beamsplitter 1200B, the second beamsplitter 1400B, and the third beamsplitter 1600B are disposed inside the housing 1900B, and the bidirectional optical transceiver 1100B, the first connector 1300B, the second connector 1500B, the third connector 1700B, and the fourth connector 1800B are disposed outside the housing 1900B and attached to the housing 1900B.

It is noted that, the element in FIG. 12, whose symbol is similar to the symbol of the element in FIG. 10, has similar structure feature in connection with the element in FIG. 10. Therefore, a detail description regarding the structure feature of the element in FIG. 12 is omitted herein for the sake of brevity. In addition, the present disclosure is not limited to the structure as shown in FIG. 12, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 13:
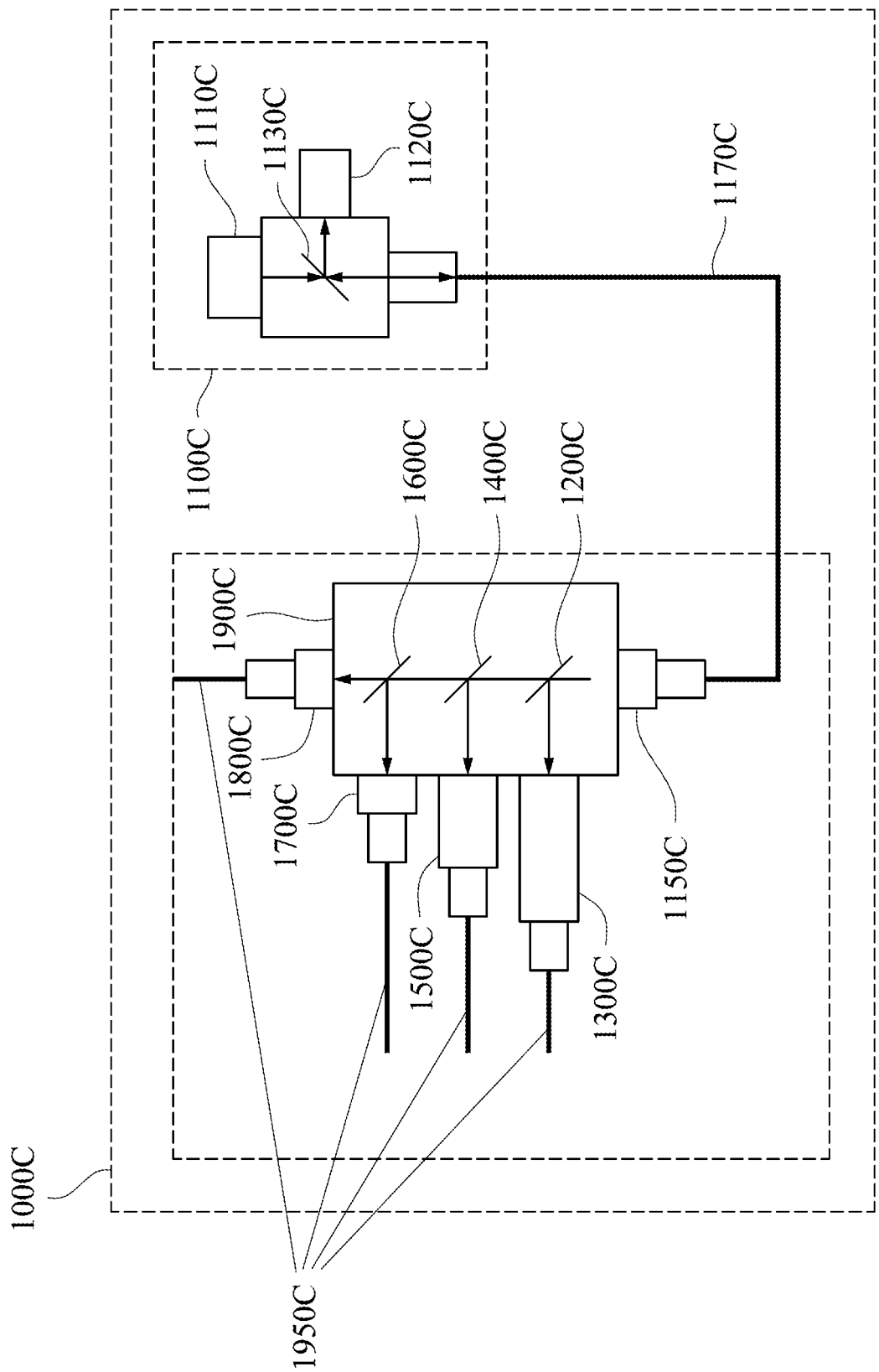
FIG. 13 depicts a schematic diagram of a one-to-many distributing device according to one embodiment of the present disclosure.

FIG. 13 depicts a schematic diagram of a one-to-many distributing device 1000C according to one embodiment of the present disclosure. It is noted that, compared with the wireless radio frequency conversion system 1000 shown in FIG. 10, the optical-electrical convertor 1100C of the wireless radio frequency conversion system 1000C shown in FIG. 13 is different, which will be described in detailed as below.

As shown in the figure, the optical-electrical convertor 1100C includes a bidirectional optical transceiver, and the bidirectional optical transceiver 1100C include a laser diode package structure (e.g., Tx TO-can) 1110C, a photodiode package structure (e.g., Rx TO-can) 1120C, and a filter 1130C. The laser diode package structure 1110C is configured to convert the electrical signal into the optical signal. The photodiode package structure 1120C is configured to convert the optical signal into the electrical signal. The filter 1130C is configured to be penetrated by the optical signal of the laser diode package structure 1110C, and configured to reflect the optical signal of the first beamsplitter 1200C to the photodiode package structure 1120C.

In addition, the one-to-many distributing device 1000C further includes a fifth connector 1150C and a housing 1900C. The fifth connector 1150C is coupled to a bidirectional optical transceiver 1100C, and configured to transmit and receive the optical signal from the bidirectional optical transceiver 1100C. The first beamsplitter 1200C, the second beamsplitter 1400C, and the third beamsplitter 1600C are disposed inside the housing 1900C, and the first connector 1300C, the second connector 1500C, the third connector 1700C, the fourth connector 1800C, and the fifth connector 1150C are disposed outside the housing 1900C and attached to the housing 1900C.

In another embodiment, the one-to-many distributing device 1000C further includes an optical fiber 1170C. The optical fiber 1170C is coupled between the fifth connector 1150C and the bidirectional optical transceiver 1100C, and configured to transmit the optical signal. In one embodiment, the bidirectional optical transceivers 1100B, 1100C can be a Bi-Directional Optical Sub-Assembly (BOSA). The optical-electrical convertor 1100, the optical-electrical convertor 1100A, the laser diode package structure 1110B, 1110C, and the photodiode package structure 1120B, 1120C can be TO-can package. The first beamsplitters 1200, 1200A~1200C, the second beamsplitters 1400, 1400A~1400C, and the third beamsplitters 1600, 1600A~1600C can be beamsplitters. The first connectors 1300, 1300A~1300C, the second connectors 1500, 1500A~1500C, the third connectors 1700, 1700A~1700C, and the fourth connectors 1800, 1800A~1800C can be pigtails or receptacles.

It is noted that, the element in FIG. 13, whose symbol is similar to the symbol of the element in FIG. 10, has similar structure feature in connection with the element in FIG. 10. Therefore, a detail description regarding the structure feature of the element in FIG. 13 is omitted herein for the sake of brevity. In addition, the present disclosure is not limited to the structure as shown in FIG. 13, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figures 14, 15:
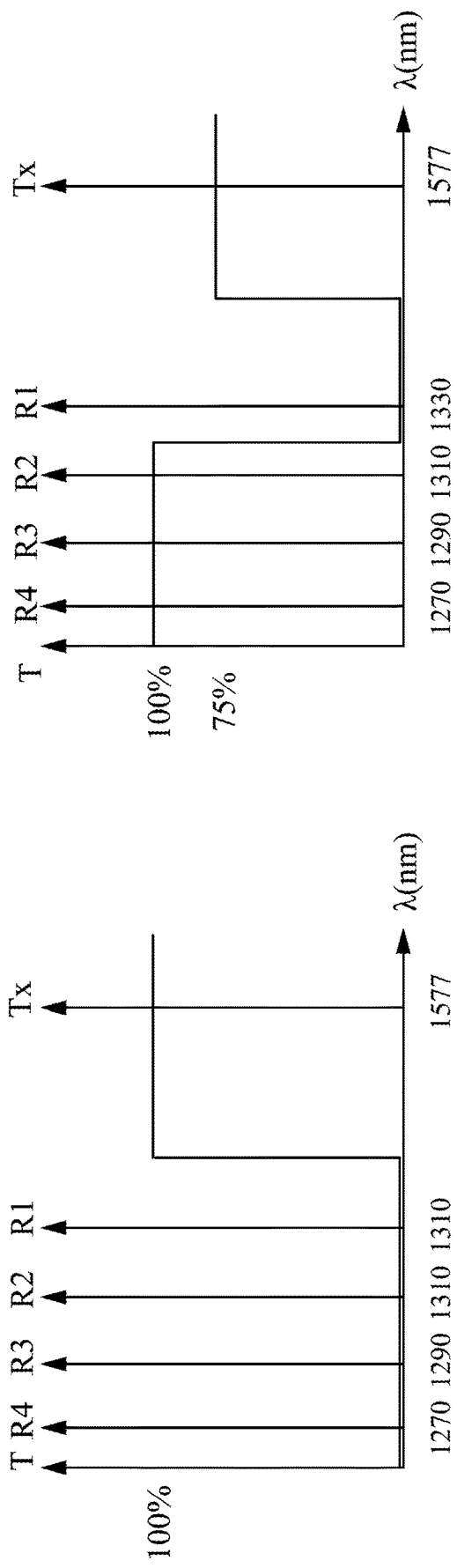
FIG. 14 depicts a schematic diagram of an experimental date of the one-to-many distributing device shown in FIG. 12 and FIG. 13 according to one embodiment of the present disclosure.
FIG. 15 depicts a schematic diagram of an experimental date of the one-to-many distributing device shown in FIG. 12 and FIG. 13 according to one embodiment of the present disclosure.
Figure 17:
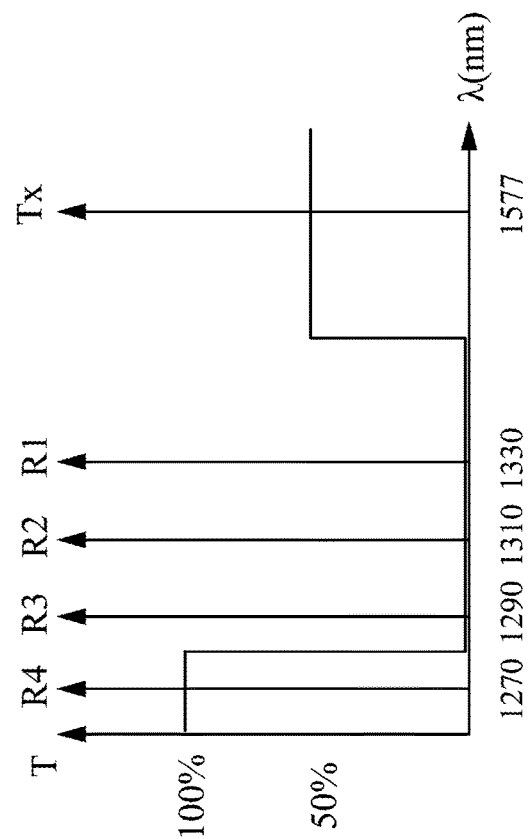
FIG. 17 depicts a schematic diagram of an experimental date of the one-to-many distributing device shown in FIG. 12 and FIG. 13 according to one embodiment of the present disclosure.
Figure 16:
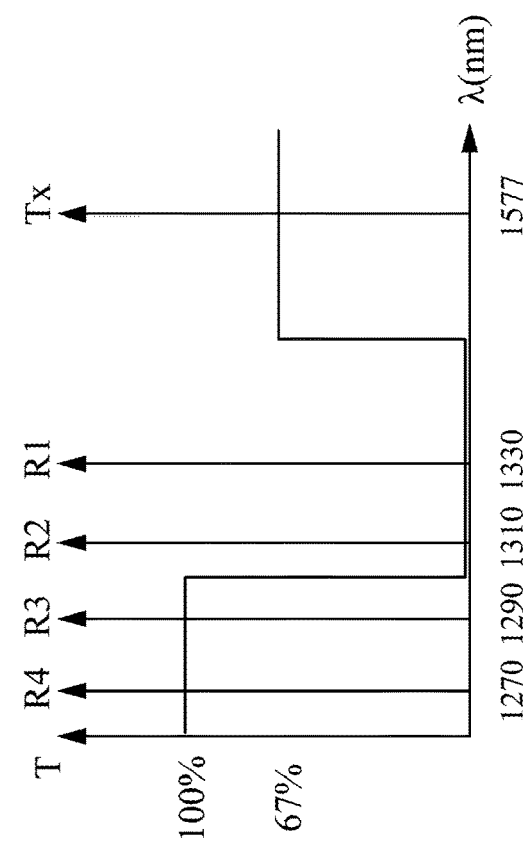
FIG. 16 depicts a schematic diagram of an experimental date of the one-to-many distributing device shown in FIG. 12 and FIG. 13 according to one embodiment of the present disclosure.

FIG. 14 depicts a schematic diagram of an experimental date of the filters 1130B, 1130C of the one-to-many distributing devices 1000B, 1000C shown in FIG. 12 and FIG. 13 according to one embodiment of the present disclosure. FIG. 15 depicts a schematic diagram of an experimental date of the first beamsplitters 1200B, 1200C of the one-to-many distributing devices 1000B, 1000C shown in FIG. 12 and FIG. 13 according to one embodiment of the present disclosure. FIG. 16 depicts a schematic diagram of an experimental date of the second beamsplitter 1400B, 1400C of the one-to-many distributing devices 1000B, 1000C shown in FIG. 12 and FIG. 13 according to one embodiment of the present disclosure. FIG. 17 depicts a schematic diagram of an experimental date of the third beamsplitters 1600B, 1600C of the one-to-many distributing devices 1000B, 1000C shown in FIG. 12 and FIG. 13 according to one embodiment of the present disclosure.

As shown in FIG. 14 to FIG. 17, the transmission spectrums can be applied in the filters 1130B, 1130C, the first beamsplitters 1200B, 1200C, the second beamsplitters 1400B, 1400C, and the third beamsplitters 1600B, 1600C of the one-to-many distributing devices 1000B, 1000C in FIG. 12 and FIG. 13 to implement the bidirectional transmitting of the optical-electrical convertor indoors.

Transmitting is used as an example herein. The optical wavelength of the laser diode package structures (e.g., Tx TO-can) 1110B, 1110C in FIG. 12 and FIG. 13 can be defined as 1577 nanometers (nm). Therefore, the optical signal can penetrate the filters 1130B, 1130C. Subsequently, the optical signal can be transmitted to the first beamsplitters 1200B, 1200C, the second beamsplitters 1400B, 1400C, and the third beamsplitters 1600B, 1600C.

The optical signal can be partially reflected by the beamsplitters 1200B, 1200C, 1400B, 1400C, 1600B, 1600C, and the optical signal partially penetrates the beamsplitters 1200B, 1200C, 1400B, 1400C, 1600B, 1600C. Therefore, the optical signal can be distributed properly so as to be transmitted to a corresponding one of the first connectors 1300B, 1300C, the second connectors 1500B, 1500C, the third connectors 1700B, 1700C, and the fourth connectors 1800B, 1800C in FIG. 12 and FIG. 13.

The energy level of the optical signal of each of the connectors 1300B, 1300C, 1500B, 1500C, 1700B, 1700C, 1800B, 1800C in FIG. 12 and FIG. 13 can be defined by the transmission efficiency of each of the beamsplitter at 1577 nm. Assume that the energy levels of the optical signal of each of connectors are equal, the transmittances of the first beamsplitters 1200B, 1200C, the second beamsplitters 1400B, 1400C, and the third beamsplitters 1600B, 1600C can be 75% in FIG. 15, 67% in FIG. 16, and 50% in FIG. 17 respectively.

Receiving is used as an example. The optical wavelength of the first connectors 1300B, 1300C, the second connectors 1500B, 1500C, the third connectors 1700B, 1700C, and the fourth connectors 1800B, 1800C in FIG. 12 and FIG. 13 can be defined as 1330 nm, 1310 nm, 1290 nm, and 1270 nm.

According to the transmission spectrum of the first beamsplitters 1200B, 1200C, the second beamsplitters 1400B, 1400C, and the third beamsplitters 1600B, 1600C, the optical signal of the first connectors 1300B, 1300C can be reflected by the first beamsplitters 1200B, 1200C, and transmit to the bidirectional optical transceivers 1100B, 1100C. The optical signal of the second connector 1500B, 1500C can be reflected by the second beamsplitter 1400B, 1400C, and penetrate the first beamsplitters 1200B, 1200C. The optical signal of the third connector 1700B, 1700C can be reflected by the third beamsplitters 1600B, 1600C, and penetrate the first beamsplitters 1200B, 1200C and the second beamsplitters 1400B, 1400C. The optical signal of the fourth connector 1800B, 1800C penetrates the first beamsplitters 1200B, 1200C, the second beamsplitters 1400B, 1400C, and the third beamsplitters 1600B, 1600C.

The optical signal of the first connectors 1300B, 1300C, the second connectors 1500B, 1500C, the third connectors 1700B, 1700C, and the fourth connectors 1800B, 1800C can be transmitted to the bidirectional optical transceivers 1100B, 1100C. Subsequently, the optical signal can be reflected by the filters 1130B, 1130C to the photodiode package structure (RX TO-can) 1120B, 1120C.

It can be understood from the embodiments of the present disclosure that application of the present disclosure has the following advantages. The present disclosure provides a wireless radio frequency conversion system and a one-to-many distributing device. Since the wireless radio frequency conversion system adopts the conversion device and the optical fiber network to implement the connections between the elements. Therefore, the elements of the wireless radio frequency conversion system can be disposed on different sides of the wireless radio frequency conversion system. As such, the system deployment of the wireless radio frequency conversion system is more flexible and simpler Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wireless radio frequency conversion system, comprising:
   a primary distributing device, configured to receive a first photoelectric signal;
   a one-to-many conversion device, configured to perform an optical-electrical conversion and a one-to-many conversion to the first photoelectric signal so as to generate a plurality of second photoelectric signals;
   a plurality of first optical fiber networks, configured to transmit the plurality of second photoelectric signals;
   a plurality of remote antenna devices, configured to receive and perform the optical-electrical conversion to the plurality of second photoelectric signals so as to generate a plurality of third photoelectric signals; and
   a plurality of antennas, configured to transmit the plurality of third photoelectric signals.

2. The wireless radio frequency conversion system of claim 1, further comprising:
   a wireless front-end device, configured to receive a radio frequency signal; and
   a first optical-electrical convertor, configured to receive and transform the radio frequency signal into the first photoelectric signal, wherein the first photoelectric signal is an optical signal.

3. The wireless radio frequency conversion system of claim 2, further comprising:
   a second optical fiber network, configured to transmit the first photoelectric signal.

4. The wireless radio frequency conversion system of claim 3, wherein the primary distributing device comprises:
   a second optical-electrical convertor, configured to receive and transform the first photoelectric signal from the second optical fiber network into a first electrical signal; and
   a radio frequency processor, configured to perform a signal processing to the first electrical signal.

5. The wireless radio frequency conversion system of claim 4, wherein the one-to-many conversion device is configured to perform the optical-electrical conversion and the one-to-many conversion to the first electrical signal so as to generate and transmit the plurality of second photoelectric signals through the plurality of first optical fiber networks, wherein the plurality of second photoelectric signals are optical signals.

6. The wireless radio frequency conversion system of claim 5, wherein each of the plurality of remote antenna devices comprises:
   an antenna terminal optical-electrical convertor, configured to receive and perform the optical-electrical conversion to one of the plurality of second photoelectric signals from one of the plurality of first optical fiber networks so as to generate a second electrical signal.

7. The wireless radio frequency conversion system of claim 6, wherein each of the plurality of remote antenna devices is further configured to perform the signal processing to the second electrical signal so as to generate the plurality of third photoelectric signals, and transmit the plurality of third photoelectric signals to a corresponding antenna of the plurality of antennas.

8. The wireless radio frequency conversion system of claim 4, wherein the radio frequency processor distributes the first electrical signal into a plurality of first sub-photoelectric signals, wherein the one-to-many conversion device comprises:
   a third optical-electrical convertor, configured to receive and perform the optical-electrical conversion to one of the plurality of first sub-photoelectric signals so as to generate one of a plurality of second sub-photoelectric signals, wherein the plurality of second sub-photoelectric signals are optical signals;
a one-to-many distributing device, configured to receive and distribute one of the plurality of second sub-photoelectric signals into a plurality of second photoelectric signals; and
a third optical fiber network, configured to connect the third optical-electrical convertor and the one-to-many distributing device.

9. The wireless radio frequency conversion system of claim 8, wherein the one-to-many distributing device comprises:
a first beamsplitter, configured to partially reflect one of the plurality of second sub-photoelectric signals so as to generate a first reflecting signal, and be partially penetrated by one of the plurality of second sub-photoelectric signals so as to generate a first penetrating signal;
a first connector, configured to output the first reflecting signal to be one of the plurality of second photoelectric signals;
a second beamsplitter, configured to partially reflect the first penetrating signal so as to generate a second reflecting signal, and be partially penetrated by the first penetrating signal so as to generate a second penetrating signal; and
a second connector, configured to output the second reflecting signal to be one of the plurality of second photoelectric signals.

10. The wireless radio frequency conversion system of claim 9, wherein each of the plurality of remote antenna devices comprises:
an antenna terminal optical-electrical convertor, configured to receive and perform the optical-electrical conversion to one of the plurality of second photoelectric signals so as to generate one of the plurality of third photoelectric signals; and
a front-end processor, configured to perform the signal processing to and transmit one of the plurality of third photoelectric signals to one of the plurality of antennas.

11. The wireless radio frequency conversion system of claim 1, wherein the primary distributing device comprises:
a baseband transceiver, configured to perform a signal processing to the first photoelectric signal so as to generate a first sub-photoelectric signal;
wherein the one-to-many conversion device is configured to perform the optical-electrical conversion and the one-to-many conversion to the first sub-photoelectric signal so as to generate and transmit the plurality of second photoelectric signals through the plurality of first optical fiber networks, wherein the plurality of second photoelectric signals are optical signals.

12. A wireless radio frequency conversion system, comprising:
a primary distributing device, configured to receive or transmit a first photoelectric signal;
a one-to-many conversion device, configured to perform an optical-electrical conversion and a one-to-many conversion to the first photoelectric signal so as to generate a plurality of second photoelectric signals, or perform the optical-electrical conversion to and a many-to-one conversion to the plurality of second photoelectric signals so as to generate the first photoelectric signal;
a plurality of remote antenna devices, configured to perform the optical-electrical conversion between the plurality of second photoelectric signals and a plurality of third photoelectric signals; and
a plurality of antennas, configured to receive or transmit the plurality of third photoelectric signals.

13. The wireless radio frequency conversion system of claim 12, further comprising:
a wireless front-end device, configured to receive or transmit a radio frequency signal; and
a first optical-electrical convertor, configured to perform the optical-electrical conversion between the radio frequency signal and the first photoelectric signal, wherein the first photoelectric signal is an optical signal.

14. The wireless radio frequency conversion system of claim 13, further comprising:
a first optical fiber network, configured to transmit the first photoelectric signal.

15. The wireless radio frequency conversion system of claim 14, wherein the primary distributing device comprises:
a second optical-electrical convertor, configured to perform the optical-electrical conversion between the first photoelectric signal and a first electrical signal; and
a radio frequency processor, configured to perform a signal processing to the first electrical signal.

16. The wireless radio frequency conversion system of claim 15, wherein the one-to-many conversion device is configured to perform the optical-electrical conversion and the one-to-many conversion to the first electrical signal so as to generate the plurality of second photoelectric signals, or perform the optical-electrical conversion and the many-to-one conversion to the plurality of second photoelectric signals so as to generate the first electrical signal, wherein the plurality of second photoelectric signals are optical signals, wherein the wireless radio frequency conversion system further comprises:
a second optical fiber network, configured to transmit the plurality of second photoelectric signals.

17. The wireless radio frequency conversion system of claim 16, wherein each of the plurality of remote antenna devices comprises:
an antenna terminal optical-electrical convertor, configured to perform the optical-electrical conversion between one of the plurality of second photoelectric signals and a second electrical signal.

18. The wireless radio frequency conversion system of claim 17, wherein each of the plurality of remote antenna devices is further configured to perform the signal processing between the second electrical signal and the plurality of third photoelectric signals.

19. The wireless radio frequency conversion system of claim 15, wherein the radio frequency processor distributes the first electrical signal into a plurality of first sub-photoelectric signals, or processes the plurality of first sub-photoelectric signals into the first electrical signal, wherein the one-to-many conversion device comprises:
a third optical-electrical convertor, configured to perform the optical-electrical conversion to one of the plurality of first sub-photoelectric signals and one of a plurality of second sub-photoelectric signals, wherein the plurality of second sub-photoelectric signals are optical signals;
a one-to-many distributing device, configured to distribute one of the plurality of second sub-photoelectric signals into a plurality of second photoelectric signals, or process the plurality of second photoelectric signals into one of the plurality of second sub-photoelectric signals; and a third optical fiber network, configured to connect the third optical-electrical convertor and the one-to-many distributing device.

20. The wireless radio frequency conversion system of claim 19, wherein the one-to-many distributing device comprises:

a first beamsplitter, configured to partially reflect one of the plurality of second sub-photoelectric signals so as to generate a first reflecting signal, and be partially penetrated by one of the plurality of second sub-photoelectric signals so as to generate a first penetrating signal;

a first connector, configured to output the first reflecting signal to be one of the plurality of second photoelectric signals;

a second beamsplitter, configured to partially reflect the first penetrating signal so as to generate a second reflecting signal, and be partially penetrated by the first penetrating signal so as to generate a second penetrating signal; and a second connector, configured to output the second reflecting signal to be one of the plurality of second photoelectric signals.

21. The wireless radio frequency conversion system of claim 20, wherein each of the plurality of remote antenna devices comprises:

an antenna terminal optical-electrical convertor, configured to perform the optical-electrical conversion to one of the plurality of second photoelectric signals and one of the plurality of third photoelectric signals; and a front-end processor, configured to perform the signal processing to one of the plurality of third photoelectric signals and the radio frequency signal.

22. The wireless radio frequency conversion system of claim 12, wherein the primary distributing device comprises:

a baseband transceiver, configured to perform a signal processing between the first photoelectric signal and a first sub-photoelectric signal;

wherein the one-to-many conversion device is configured to perform the optical-electrical conversion and the one-to-many conversion to the first sub-photoelectric signal so as to generate the plurality of second photoelectric signals, or perform the optical-electrical conversion to and the many-to-one conversion to the plurality of second photoelectric signals so as to generate the first sub-photoelectric signal, wherein the plurality of second photoelectric signals are optical signals.

23. A one-to-many distributing device, applied in a wireless radio frequency conversion system, comprising:

an optical-electrical convertor, configured to perform an optical-electrical conversion between an electrical signal and an optical signal, wherein the optical-electrical convertor comprises a laser diode package structure, wherein the laser diode package structure is configured to convert the electrical signal into the optical signal;

a first beamsplitter, configured to partially reflect the optical signal so as to generate a first reflecting signal, and be partially penetrated by the optical signal so as to generate a first penetrating signal;

a first connector, configured to output the first reflecting signal;

a second beamsplitter, configured to partially reflect the first penetrating signal so as to generate a second reflecting signal, and be partially penetrated by the first penetrating signal so as to generate a second penetrating signal; and a second connector, configured to output the second reflecting signal.

24. The one-to-many distributing device of claim 23, wherein the one-to-many distributing device further comprises:

a housing, wherein the first beamsplitter and the second beamsplitter are disposed inside the housing, and the laser diode package structure, the first connector, and the second connector are disposed outside the housing and attached to the housing.

25. The one-to-many distributing device of claim 23, wherein the one-to-many distributing device further comprises:

a third connector, coupled to the laser diode package structure, and configured to receive the optical signal from the laser diode package structure; and a housing, wherein the first beamsplitter and the second beamsplitter are disposed inside the housing, and the first connector, the second connector, and the third connector are disposed outside the housing and attached to the housing.

26. The one-to-many distributing device of claim 25, further comprising:

an optical fiber, coupled between the third connector and the laser diode package structure, and configured to transmit the optical signal.

27. The one-to-many distributing device of claim 23, wherein the optical-electrical convertor comprises a bidirectional optical transceiver, wherein the bidirectional optical transceiver comprises:

the laser diode package structure, configured to convert the electrical signal into the optical signal;

a photodiode package structure, configured to convert the optical signal into the electrical signal; and a filter, configured to be penetrated by the optical signal of the laser diode package structure, and configured to reflect the optical signal of the first beamsplitter to the photodiode package structure;

wherein the one-to-many distributing device further comprises:

a housing, wherein the first beamsplitter and the second beamsplitter are disposed inside the housing, and the bidirectional optical transceiver, the first connector, and the second connector are disposed outside the housing and attached to the housing.

28. The one-to-many distributing device of claim 23, wherein the optical-electrical convertor comprises a bidirectional optical transceiver, wherein the bidirectional optical transceiver comprises:

the laser diode package structure, configured to convert the electrical signal into the optical signal;

a photodiode package structure, configured to convert the optical signal into the electrical signal; and a filter, configured to be penetrated by the optical signal of the laser diode package structure, and configured to reflect the optical signal of the first beamsplitter to the photodiode package structure;

wherein the one-to-many distributing device further comprises:

a third connector, coupled to the bidirectional optical transceiver, and configured to transmit or receive the optical signal from the bidirectional optical transceiver; and a housing, wherein the first beamsplitter and the second beamsplitter are disposed inside the housing, and the first connector, the second connector, and the third connector are disposed outside the housing and attached to the housing.

29. The one-to-many distributing device of claim 28, further comprising:

an optical fiber, coupled between the third connector and the bidirectional optical transceiver, and configured to transmit the optical signal.

30. The one-to-many distributing device of claim 23, further comprising:

a first optical fiber, coupled to the first connector, and configured to transmit the first reflecting signal; and a second optical fiber, coupled to the second connector, and configured to transmit the second reflecting signal.

* * * * *